United States Patent
Gonsalves et al.

(10) Patent No.: US 6,571,255 B1
(45) Date of Patent: May 27, 2003

(54) MODIFICATION OF MEDIA WITH COMMON ATTRIBUTES ON A DIGITAL NONLINEAR EDITING SYSTEM

(76) Inventors: Robert Gonsalves, 15 Hillside Rd., Wellesley, MA (US) 02481; Michael D. Laird, 38 Westgate Crossing, Nashua, NH (US) 03062

( * ) Notice: Subject to any disclaimer, the term of this patent is extended or adjusted under 35 U.S.C. 154(b) by 0 days.

(21) Appl. No.: 09/392,823

(22) Filed: Sep. 9, 1999

Related U.S. Application Data

(63) Continuation-in-part of application No. 09/293,730, filed on Apr. 16, 1999.

(51) Int. Cl.⁷ .............................. G06F 17/00; G06F 7/00
(52) U.S. Cl. .................................... 707/104.1; 382/167
(58) Field of Search ....................... 707/10, 201, 104.1, 707/500.1; 709/201, 104.1, 1, 500.1; 345/726, 722–723; 386/52; 382/167

(56) References Cited

U.S. PATENT DOCUMENTS

| | | | |
|---|---|---|---|
| 4,189,742 A | 2/1980 | Klopsch ...................... 358/518 |
| 4,272,780 A | 6/1981 | Belmares-Sarabia et al. .............. 348/109 |
| 4,298,885 A | 11/1981 | Okada ........................ 348/679 |
| 4,367,465 A | 1/1983 | Mati et al. ................... 345/180 |
| 4,385,311 A | 5/1983 | Harwood et al. ........... 348/653 |
| 4,410,908 A | 10/1983 | Belmares-Sarabia et al. .............. 348/661 |
| 4,418,358 A | 11/1983 | Poetsch et al. ............. 358/506 |
| 4,488,245 A | 12/1984 | Dalke et al. ................ 382/167 |
| 4,492,978 A | 1/1985 | Thomas ................. 375/240.01 |
| 4,571,632 A | 2/1986 | Schaphorst et al. .... 358/426.01 |
| 4,599,643 A | 7/1986 | Harlan ........................ 348/380 |
| 4,602,286 A | 7/1986 | Kellar et al. ................ 348/597 |
| 4,642,632 A | 2/1987 | Ohyagi et al. ............. 340/7.43 |
| 4,642,676 A | 2/1987 | Weinger ..................... 348/578 |
| 4,679,067 A | 7/1987 | Belmares-Sarabia et al. ............. 348/655 |
| 4,694,329 A | 9/1987 | Belmares-Sarabia et al. ............. 348/586 |
| 4,698,666 A | 10/1987 | Lake, Jr. et al. ............ 348/584 |
| 4,727,412 A | 2/1988 | Fearing et al. .............. 348/577 |
| 4,733,230 A | 3/1988 | Kurihara et al. ............ 345/589 |
| 4,750,050 A | 6/1988 | Belmares-Sarabia et al. ................. 386/4 |
| 4,763,186 A | 8/1988 | Belmares-Sarabia et al. .............. 348/650 |
| 4,782,397 A | 11/1988 | Kimoto ...................... 358/448 |
| 4,794,460 A | 12/1988 | Shiota ........................ 386/128 |
| 4,797,733 A | 1/1989 | Takagi et al. ............ 348/225.1 |
| 4,811,084 A | 3/1989 | Belmares-Sarabia et al. .............. 348/592 |
| 4,823,184 A | 4/1989 | Belmares-Sarabia et al. .............. 348/650 |

(List continued on next page.)

FOREIGN PATENT DOCUMENTS

| | | |
|---|---|---|
| EP | 0594312 A1 | 4/1994 |
| EP | 0702 832 B1 | 3/1996 |
| EP | 0871177 A2 | 10/1998 |
| WO | WO 94/29868 | 12/1994 |
| WO | WO 96/13807 | 5/1996 |
| WO | WO 97/39452 | 10/1997 |
| WO | WO 98/11510 | 3/1998 |

*Primary Examiner*—Greta Robinson
*Assistant Examiner*—Susan Rayyan

(57) ABSTRACT

A modification may be specified for several segments sharing a common attribute. Such a shared modification may be combined with other modifications made to a composition or part of a composition. A modification may be applied to section of digital media, where a first segment of a media composition represents at least a section of a digital media source. An indication of the modification is stored such that the modification is applied to other segments on the system having an attribute in common with the first segment. Such attributes may be related to the source from which the segment originates or the composition in which the segment is used.

63 Claims, 17 Drawing Sheets

U.S. PATENT DOCUMENTS

| | | | |
|---|---|---|---|
| 4,827,344 A | 5/1989 | Astle et al. .................. | 348/597 |
| 4,857,994 A | 8/1989 | Belmares-Sarabia et al. ............. | 348/586 |
| 4,862,251 A | 8/1989 | Belmares-Sarabia et al. .............. | 348/577 |
| 4,866,511 A | 9/1989 | Belmares-Sarabia et al. ............. | 348/650 |
| 4,876,589 A | 10/1989 | Orsburn et al. ............. | 348/586 |
| 4,907,071 A | 3/1990 | Belmares-Sarabia et al. ............. | 348/586 |
| 5,038,206 A | 8/1991 | Ubukata .................... | 348/631 |
| 5,070,397 A | 12/1991 | Wedderburn-Bisshop ... | 348/591 |
| 5,089,882 A | 2/1992 | Kaye et al. ................. | 348/645 |
| 5,129,013 A | 7/1992 | Holzmann et al ........... | 382/276 |
| 5,130,789 A | 7/1992 | Dobbs et al. ................ | 358/500 |
| 5,134,688 A | 7/1992 | Corthout .................... | 345/442 |
| 5,140,416 A | 8/1992 | Tinkler ....................... | 348/33 |
| 5,142,273 A | 8/1992 | Wobermin .................. | 345/690 |
| 5,146,325 A | 9/1992 | Ng .......................... | 348/384.1 |
| 5,153,937 A | 10/1992 | Wobermin et al. .......... | 345/592 |
| 5,179,641 A | 1/1993 | Comins et al. ............. | 345/596 |
| 5,181,113 A | 1/1993 | Chang ....................... | 348/468 |
| 5,218,671 A | 6/1993 | Liao et al. .................. | 345/595 |
| 5,241,372 A | 8/1993 | Ohba ......................... | 348/578 |
| 5,253,043 A | 10/1993 | Gibson ....................... | 348/708 |
| 5,283,651 A | 2/1994 | Ishizuka .................... | 348/704 |
| 5,289,295 A | 2/1994 | Yumiba et al. ............. | 358/518 |
| 5,313,275 A | 5/1994 | Daly et al. ................. | 348/592 |
| 5,317,678 A | 5/1994 | Okawara et al. ............ | 345/426 |
| 5,325,449 A | 6/1994 | Burt et al. .................. | 382/240 |
| 5,373,327 A | 12/1994 | McGee et al. .............. | 348/645 |
| 5,381,185 A | 1/1995 | Ohki et al. | |
| 5,392,385 A | 2/1995 | Evangelisti et al. ........ | 345/611 |
| 5,398,123 A | 3/1995 | Katsuma .................... | 358/518 |
| 5,418,895 A | 5/1995 | Lee .......................... | 345/604 |
| 5,420,971 A | 5/1995 | Westerink et al. .......... | 382/199 |
| 5,438,651 A | 8/1995 | Suzuki et al. ............... | 345/592 |
| 5,444,835 A | 8/1995 | Turkowski .................. | 345/592 |
| 5,450,134 A | 9/1995 | Legate ....................... | 348/467 |
| 5,479,590 A | 12/1995 | Lin ............................ | 345/611 |
| 5,488,429 A | 1/1996 | Kojima et al. .............. | 348/653 |
| 5,488,674 A | 1/1996 | Burt et al. .................. | 382/284 |
| 5,506,946 A | 4/1996 | Bar et awl. .................. | 345/600 |
| 5,510,843 A | 4/1996 | Keene et al. ................ | 348/446 |
| 5,510,851 A | 4/1996 | Foley et al. ................. | 348/658 |
| 5,532,751 A | 7/1996 | Lui ............................ | 348/452 |
| 5,557,334 A | 9/1996 | Legate ....................... | 348/473 |
| 5,557,339 A | 9/1996 | Dadourian .................. | 348/586 |
| 5,557,340 A | 9/1996 | Millward .................... | 348/627 |
| 5,600,376 A | 2/1997 | Casavant et al. ......... | 348/423.1 |
| 5,611,030 A | 3/1997 | Stokes ........................ | 345/590 |
| 5,615,324 A | 3/1997 | Kuboyama .................. | 345/441 |
| 5,625,421 A | 4/1997 | Faroudja et al. ............ | 348/607 |
| 5,630,037 A | 5/1997 | Schindler .................... | 345/592 |
| 5,633,687 A | 5/1997 | Bhayani et al. ............. | 348/441 |
| 5,636,290 A | 6/1997 | Kita et al. ................... | 382/167 |
| 5,638,136 A | 6/1997 | Kojima et al. .............. | 348/653 |
| 5,638,138 A | 6/1997 | Hickman .................... | 348/678 |
| 5,645,884 A | 7/1997 | Harlow, Jr. et al. ............. | 427/8 |
| 5,657,094 A | 8/1997 | Moriwake ................... | 348/578 |
| 5,659,639 A | 8/1997 | Mahoney et al. ........... | 382/309 |
| 5,661,525 A | 8/1997 | Kovacevicet et al. ....... | 348/452 |
| 5,663,765 A | 9/1997 | Matsuse et al. ................ | 217/58 |
| 5,682,443 A | 10/1997 | Gouch et al. ............... | 382/254 |
| 5,703,654 A | 12/1997 | Iizuka ........................ | 348/446 |
| 5,703,659 A | 12/1997 | Tanaka ....................... | 348/576 |
| 5,715,377 A | 2/1998 | Fukushima et al. .......... | 358/1.9 |
| 5,729,360 A | 3/1998 | Kita et al. ................... | 358/500 |
| 5,745,121 A | 4/1998 | Politis ........................ | 345/619 |
| 5,752,029 A * | 5/1998 | Wissner .................... | 707/104.1 |
| 5,754,180 A | 5/1998 | Kivolowitz et al. ......... | 345/418 |
| 5,770,299 A | 6/1998 | Dannenhauer et al. ...... | 428/195 |
| 5,774,112 A | 6/1998 | Kasson ....................... | 345/601 |
| 5,805,169 A * | 9/1998 | Harada et al. .............. | 345/634 |
| 5,874,988 A * | 2/1999 | Gu .............................. | 348/97 |
| 5,888,444 A | 3/1999 | Dannenhauer et al. ...... | 264/482 |
| 6,172,675 B1 * | 1/2001 | Ahmad et al. .............. | 345/723 |
| 6,215,485 B1 * | 4/2001 | Phillips ...................... | 345/698 |
| 6,229,576 B1 * | 5/2001 | Tarr et al. ................... | 345/723 |
| 6,266,053 B1 * | 7/2001 | French et al. ............... | 345/440 |
| 6,269,394 B1 * | 7/2001 | Kenner et al. .............. | 709/217 |
| 6,285,361 B1 * | 9/2001 | Brewer et al. .............. | 345/723 |
| 6,351,765 B1 * | 2/2002 | Pietropaolo et al. ........ | 348/722 |

* cited by examiner

COMPOSITION SOURCE TABLE
500

| SOURCE DATA STRUCTURE | SOURCE IMAGE MODIFICATION |
|---|---|
| SOURCE CLIP X | CHANGE IN HUE FOR ALL PIXELS |
| ORIGINAL MEDIA OBJECT Y | BLEND WITH SEGMENT Z |
| MASTER CLIP W | BOX WIPE WITH SEGMENT V |
| SOURCE CLIP U | AUDIO MIX WITH SEGMENT T |

FIG. 17

MODIFICATION OF MEDIA WITH COMMON ATTRIBUTES ON A DIGITAL NONLINEAR EDITING SYSTEM

This application is a continuation-in-part of application Ser. No. 09/293,730, filed Apr. 16, 1999, entitled SOURCE COLOR MODIFICATION ON A DIGITAL NON LINEAR EDITING SYSTEM.

BACKGROUND

Digital non-linear editing (DNLE) is a process by which digital media may be edited. DNLE, as the name implies, is performed on digital media stored as data in digital media files on a digital random access medium. DNLE may be conducted in a non-linear fashion because the digital media files in which the digital media is stored can be randomly accessed. Thus an editor may access a piece of the digital media without having to proceed sequentially through other pieces of the digital media stored in the same or other digital media files. More than one editor also may be able to access different pieces of the same digital media contemporaneously. The digital media may be a digitized version of a film or videotape or digital media produced through live capture onto a disk of a graphics or animation software application. Example commercial DNLE systems include the Media Composer® or the Avid® Symphony™ video production system or NewsCutter® news editing system available from Avid Technology, Inc. For a more detailed description of DNLE, see *Digital Nonlinear Editing, New Approaches to Editing Film and Video*, Second Edition, 1998 by Thomas Ohanian.

Basic components of digital media are segments, which are described in more detail below. For audio segments, each segment includes a plurality of sequential audio samples. For a video, a segment comprises at least one digital image, where each digital image comprises an array of picture elements called pixels. A video segment has several properties or attributes associated with digital images of the video segment. The attributes include, inter alia, image formatting attributes, color attributes, storage location attributes, and source attributes. Source attributes define the source data structures from which a segment originates. Segments and their source data structures are described below in more detail.

Formatting attributes may include: the color format of the pixels; the pixel depth of the pixels; the number of rows and columns of pixels, commonly referred to as the image size; the shape of the pixels, for example, square and non-square; the type of video signal on which the digital image is, was or will be transmitted; the video rate at which the signal is, was or will be transmitted; the sampling rate by which the video signal is, was or will be transmitted, for example, 4:2:2 or 4:4:4; and the pixel clock rate used to transfer the digital pixel data within a DNLE system.

Many of these formatting attributes are defined by standards. For example, in a standard square pixel NTSC image format, there are 640 columns and 480 rows of pixels. Further, in both non-square pixel PAL format and non-square NTSC format, pixel information is transmitted at a rate of 27 MHZ.

Video signals may be classified into two major types: composite signals and component signals. Component signals represent a pixel with multiple color components, each component defining a value along a dimension of the color space in which the color being represented is defined. A composite video signal is an analog signal that uses a high frequency subcarrier to encode color information. The subcarrier is a sinewave of which the amplitude is modulated by the saturation of the color represented by the signal, and the hue of the color is encoded as a phase difference from a color burst. Analog composite signals generally are used to broadcast television video signals.

The pixel depth of an image defines the number of binary digits necessary to store the color of a pixel on a computer-readable medium. For example, a common pixel depth for a component color format is 24 bits, where 8 bits are used to store each color component.

Video and audio segments may also have modification attributes associated with them. Modification attributes of a segment are attributes associated with modifications made to the segment by a system user such as an editor or a colorist. These modifications can be applied to digital images and audio samples on a DNLE. Video or image modifications include, inter alia, resizing an image, keying, panning and scanning, blending, box wipes, dissolves, color effects, color correction, and other various modifications and effects known to those skilled in DNLE. Audio modification include, inter alia, mixing, sweetening, manipulating audio waveforms, and other various modifications and effects known to those skilled in the art.

A sub-class of video modification is color modification. Color modification may be performed both to correct color errors due to process errors and to adjust the colors used in the video for artistic expression. For a given image, color modifications may be applied to all pixels in the image or pixels of a portion of the image. Color modifications may include enhancing contrasts or color in an image to give a program an overall "look," or applying special effects to selected segments. Other color modifications may be made by an editor during an editing session to correct problems with color or lighting resulting from the source of the media. Such corrections may include color balancing for camera and lighting differences, correcting for film processing differences, matching colors and tones from shot to shot, or adjusting video levels for differences in source tapes, source decks, etc.

There are a variety of component color formats used to represent color. Component color formats are used in component video signals as well as in digital pixel streams. An digital image storage RGB (Red, Green, Blue) format represents a color with a red component, a green component and a blue component. CMY (Cyan, Magenta, Yellow, Black) format represents a color with a cyan component, a magenta component, and a yellow component. CMY is a format commonly used by printers. The CMY components are color opposites of RGB components. In a three-dimensional coordinate system, each component of either the RGB or the CMY format represents a value along an axis, the combination of the values defining a cubic color space.

The color formats HSL (Hue, Saturation, Lightness or Luminance) and HSV (Hue, Saturation, Value) represent a color with a hue component, a saturation component, and a luma component. In a three-dimensional coordinate system, the luma component represents a value along a luma axis, the hue component represents the angle of a chroma vector with respect to the luma axis and the saturation component represents the magnitude of the chroma vector. The combination of the values defines a hexagonal cone-shaped color space around the luma axis.

YCrCb, YUV, and YIQ are three color formats that represent a color with a luma component Y, and two chroma components, Cr and Cb, U and V, or I and Q, respectively, that define a chroma vector. In a three-dimensional coordinate system, each component of either the YCrCb, YUV, and YIQ format represents a value along an axis, the combination of the values defining a cylindrical color space around the luma axis. The chroma components define the chroma vector. In data formats with a luma component, the luma component can be used independently to represent a pixel in a black and white image to be displayed, for example, with a black and white monitor.

A typical color modification in HSL color space may include increasing a color component or a combination of color components for all pixels in each digital image of a section of digital media. Typically, an editor accesses a segment of a composition that represents the section of media through an editor interface and inputs desired color modifications through the editor interface. Some systems permit an editor to apply color modifications to only portions of a digital image. Portions of a digital image can also be described as one or more pixels. For example, an editor may select with a mouse, keyboard, or some other editor input device a portion of the image and define color modifications for the selected portion. A suitable commercial system for color modification is Avid Media Illusion™ available from Avid Technology, Inc. The Avid Media Illusion Reference Guide, available from Avid Technology, Inc. is herein incorporated by reference. Other commercial software applications may be used.

SUMMARY

One problem with current techniques for modifying digital media is that a single modification generally cannot be specified for several segments in a composition sharing a common attribute. An editor generally has to access every segment sharing the common attribute to make the modification. This process can be time-consuming and prone to error. An editor may intend on making the same modification to a first and second segment sharing a common attribute, but the modifications may be inconsistent. Further, different editors may be working on the different segments sharing a common attribute. Although copying a modification from one segment to the other is one solution to this inconsistency, the other segment is not always available, and having to copy adds more time to the editing process. As the number of segments to be modified increases, time is added to the editing process.

The system and method described herein permits a modification to be specified for several segments sharing a common attribute. Such shared modification may be combined with other separately specified modifications made to a composition or part of a composition. Such modification may be audio modifications specified for audio segments or a video modification specified for video segments.

Accordingly, in one embodiment, a method of processing a modification to be applied to sections of digital media on a digital nonlinear editing system is provided, where a first segment of a media composition represents at least a section of a digital media source. An indication of a modification to be applied to the first segment is received, and a first attribute of the first segment is identified. A first indication of the modification is stored such that the modification is applied to other segments on the system having the first attribute in common with the first segment.

In an aspect of this embodiment, a common attribute parameter of the first segment to be applied to determine a common attribute that the first segment and other segments on the system share in common is accessed. The first attribute is identified in accordance with the common attribute parameter.

In another aspect of this embodiment, a first data structure corresponding to the first attribute is identified, where the first data structure stores modifications made to segments having the first attribute in common with the first segment. The modification is stored in the first data structure.

In yet another aspect of this embodiment, a first table corresponding to a digital media composition to which first the first segment belongs is maintained. The first table includes a plurality of entries, and each entry contains a segment attribute and an indication of a modification to be applied to segments of the media composition having the segment attribute. The first indication and the first attribute are stored in a first entry of the first table.

In another aspect of this embodiment, the first attribute is a name of a source data structure from which the first segment originates.

In another aspect of this embodiment, the first segment includes a first identifier that identifies the first data structure, and first identifier of the first segment is accessed to determine the first data structure.

In yet another aspect of this embodiment, segments on the system are sequentially accessed, where the first indication of the modification is stored in each accessed segment that has the first attribute in common with the first segment.

In another aspect of this embodiment, the first data structure is a first table including a plurality of entries, and each entry includes a modification to be applied to segments having the first attribute in common.

In another embodiment, a method of applying a modification to a first section of a digital media source on a digital nonlinear editing system is provided, where a first segment of a media composition represents the first section. The first segment is accessed, and a first source data structure from which the first segment originates is accessed, where the first source data structure represents at least the first section of the digital media source. It is determined whether the first source data structure includes a first indication that defines a first modification to be applied to sections of the digital media source represented by segments that originate from the first source data structure. If the first source data structure includes the first indication, the first modification is applied to the first section of media represented by the first segment.

In an aspect of this embodiment, a second source data structure from which the first source data structure originates is identified, the second source data structure representing the digital media source. It is determined whether the second source data structure includes a second indication that defines a second modification to be applied to sections of the digital media represented by segments that originate from the second source data structure. If the second source data structure includes the second indication and the first source data structure does not include the first indication, the second modification is applied to the first section of digital media source.

In yet another aspect of this embodiment, it is determined whether the first segment includes a second indication that defines a second modification defined by the composition to be applied to the first section of the digital media source represented by the first segment. If the first segment includes the second indication, the second modification is applied to the first section of the digital media source, such that, if the first source data structure includes the first indication, a combined modification of the first and second modification is applied to the first section of the digital media.

In another embodiment, a method of applying a modification to a first section of a digital media source on a digital nonlinear editing system is provided, where a first segment of a media composition represents the first section. The first segment is accessed and each entry of a first table that corresponds to the media composition is accessed. The first table includes a plurality of entries, and each entry contains a segment attribute and an indication of a modification to be applied to segments of the composition having the segment attribute. For each entry, it is determined whether the first segment has the segment attribute, and if the segment has the segment attribute, modifying the first section of digital media with the image modification contained in the entry.

In an aspect of this embodiment, it is determined whether the first segment includes an indication of a modification defined specifically for the composition and to be applied to the first section of the digital media source represented by the first segment. If the first segment includes the indication defined specifically for the composition, the modification defined specifically for the composition is applied to the first section of the media source, in addition to the modifications applied from the first table.

In another aspect of this embodiment, for each entry of the first table for which the first segment does have the attribute, an instruction from a user is received indicating whether to modify the first section of digital media with the modification of the entry. If the instruction instructs to modify, the first section of digital media is modified with the modification of the entry.

BRIEF DESCRIPTION OF THE DRAWINGS

In the drawings,

FIG. 17 is a table illustrating an embodiment of a composition source table.

DETAILED DESCRIPTION

Figure 1:
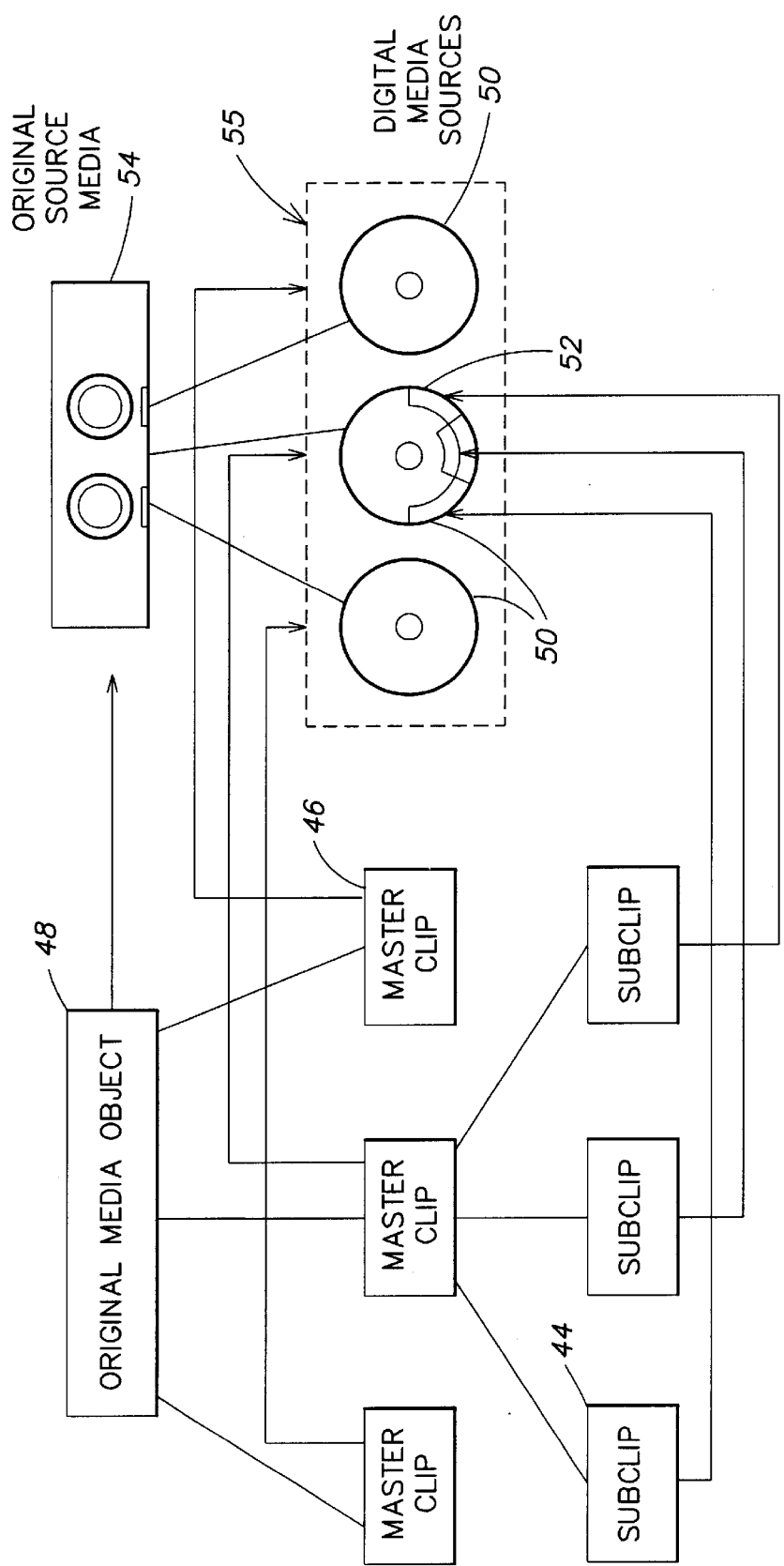
FIG. 1 is a block diagram illustrating relationships between source data structures and source media.

The following detailed description should be read in conjunction with the attached drawing in which similar reference numbers indicate similar structures. All references, including pending patent applications, cited herein are hereby expressly incorporated by reference.

A common attribute that segments may share is a common source. This common source attribute is also referred to herein as a source relationship. Modification for segments having a source relationship will now be described.

A DNLE may track or have access to information that indicates how segments of media in a composition may be related by the source of the media data that they represent. This information may be used to apply a modification to multiple segments at the same time. Such modification is referred to herein as source modification.

The relationships between segments of a source media in a composition are represented by references to source data structures representing media that can be combined or composed into a multi-media composition. Video and audio modifications, including source video and audio modifications, are typically defined within the context of a composition. Compositions are represented by composition data structures or components. Data structures for source media and compositions are described in more detail below.

Relationships between segments of media in a composition, the data structures that represent these relationships, and the relationships between these data structures themselves are described in one or more U.S. patents, including U.S. Pat. No. 5,752,029 by Michael J. Wissner and issued May 12, 1998, entitled Method And Apparatus For Representing And Editing Multimedia Compositions Using References To Tracks In The Composition To Define Components Of The Composition (The Wissner patent), U.S. Pat. No. 5,267,351, filed on Dec. 22, 1989 by Stephen J. Reber et al. entitled MEDIA STORAGE AND RETRIEVAL SYSTEM (the Reber patent), U.S. patent application Ser. No. 09/054,761 filed Apr. 3, 1998 by Eric C. Peters entitled Computer System And Process For Transferring Multiple High Bandwidth Streams Of Data Between Multiple Storage Units And Multiple Applications In A Scalable And Reliable Manner (the Peters application), incorporated herein by reference. Source relationships and data structures also are described in the OMF Interchange® Specification (OMF), version 2.1, 1997, available from the OMF Developers' Desk of Avid Technologies, Inc., and available on the Internet at the URL: http://www.avid.com/3rdparty/omfi, and in the Advanced Authoring Format specification (AAF), herein incorporated by reference.

A general summary of such source relationships and data structures that may be used will now be described.

A DNLE system typically permits an editor to create a multimedia composition. A multimedia composition is collection of relationships between time-varying media data, representing how the data should be synchronized and combined over time. Time-varying data, may be, for example, video or audio data, but is not limited to such data. Static data that does not vary with time, for example, still pictures and text, is a subset of time-varying data, and may also be included in a multimedia composition. The data are related by grouping them into different types of components, the combination of which forms a composition. A method and apparatus for representing such a media composition is described in one or more U.S. patents, including the Wissner patent, incorporated herein by reference.

Media data used in a composition includes digitized versions of physical source media such as video or audio tape, compact disk, computer generated images, etc. Physical source media are also referred to herein as physical media. Digitized versions of physical media available for use are referred to herein as digital media sources or digital sources. Digital sources may include digital samples of physical media or may have been created from application software for graphics, animation, or word processing, etc. A digital source created by application software is referred to herein as a digitally created source. A digital source digitally sampled directly from a physical media is herein referred to as an original digital media source or an original digital source. A digital source may represent a single image or a single sample, and may be a copy of or a portion of another digital source. Digital sources are stored in digital media files.

Representations of digital sources and representations of physical media are referred to herein as source data structures. Source data structures may be stored in data files in a data base or any other format. A source data structure representing a digital source may be stored in the same media data file as the digital source it represents or in a separate data file.

A source data structure includes information describing the media, whether digital or physical, that it represents. The information may include: how the digital source was created; an identification of the corresponding physical media; the sample rate (and therefore the duration of a sample), and the length of each sample in bytes; an indication of the section of the physical media that it represents and the time offset from the source physical media of its first sample. The units of this offset is the sample duration for the digital source.

Multiple digital sources of the same physical media and their corresponding source data structures also may be stored if desired. Storing multiple digital sources and source data structures allows the composition to support the interchange of media at different levels of visual or audio quality for different purposes. For example, one digital source might have a level of quality which is suitable for output to video tape, whereas an alternative digital source might be useful for displaying in a small window on a computer screen. Examples of such a system for storing and accessing multiple digital sources of a single physical media are described in the Reber patent and the Peters application, incorporated herein by reference. A commercial storage system suitable for storing media data files and composition data includes the MediaShare® storage system available from Avid Technologies, Inc. Other commercial systems may be used.

A source data structure called a source clip represents a single time-contiguous section of media. As with other source data structures, a source clip does not include the actual media data of the digital source, but only references it, for example by referring to a data file. A source clip represents a digital source, which could be an original digital source or a digitally created digital source. A source clip that represents an original digital source or a digitally created source is referred to herein as a master source clip or a master clip. A source clip that represents a digital source that is a section or a copy of an original digital source or a digitally created source is herein referred to as a subclip. A source data structure that represents a physical media is herein referred to as a physical source media object or physical media object. Source clips are described in OMF and AAF, incorporated herein by reference.

A source clip may include a source identifier that identifies another source data structure that represents either a digital source or physical media that includes the section of media represented by the source clip. If the source clip represents a digitally created digital source, the source identifier is a null value because the digitally created digital source does not originate from another source. A source clip that does not represent a digitally created digital source also includes a source offset. The source offset identifies a starting position relative to the section of media represented by the source data structure from which the source clip originates.

If a first source data structure is referred to as originating from a second source data structure herein, the second source data structure is the source of the first source data structure. If a first source data structure is referred to as indirectly originating from a second source data structure herein, the second source data structure is the source of at least a third source data structure that is the source of the first source data structure. "At least" a third data structure means that there may be multiple source data structures between the first and second source data structures, each data structure originating from the other in a source chain between the first and second source data structures. For example, a subclip may indirectly originate from a physical media object, as described below in connection with FIG. 1.

An example illustration of offset is a source clip that has an offset of 40 units and represents an original digital source. The source clip thus originates from a data structure that represents a physical media, as discussed in more detail below. If the data structure from which the source clip originates includes an offset of 100 and represents units 100–200 of a physical source, the 40 units defined by the source clip are offset from unit 100 of the physical source. The source thus represents a section of media beginning at unit 40 of the digital source, and which ends at unit 140 of the physical media.

A source data structure to which a source clip refers also may refer to another source data structure, which also may refer to yet another source data structure, etc. This type of multiple layering is described in the Wissner patent and by OMF, herein incorporated by reference.

An example embodiment of such a multilayered representation is illustrated in FIG. 1. The physical media object 48 is a source data structure that presents the physical source media 54 from which original digital media sources 50 are created. Each original digital source 50 may be stored in digital media file as described in the Reber patent. Each original digital source 50 is a digitized portion of the physical media 54, where any of the original digital sources 55 could be a digitization of the entire physical media 54. For each original digital source 50 created from the physical media 54, a master source clip 46 that represents the original digital source is also created.

Other digital sources such as 52 may be specified as sections of the original digital sources 50. Alternatively, other digital sources may be created as copies of an original digital source 50. For each other digital source 52 created, subclips 44 are created to represent the digital source 52. Each subclip 44 originates from a master clip 46 which may originate from a physical media object 48. Consequently, each subclip 44 may indirectly originate from a physical media object 48.

In order to support the editing of compositions of a variety of media, composition data structures are used for organizing and storing information concerning a composition and operations manipulating those composition data structures. The basic building blocks of a composition are called components. A composition is structured as a tree of components including a root component. A component may or may not have subcomponents, depending on its type. A component may be considered a fluctuation over time because it includes information for producing the state of its portion of the composition at any time within its range. A component thus represents a time-dependent sequence of media data or sources called a media stream.

The composition data structures used for representing the components of a composition exclude the media data itself. The composition data structures include indications of or references to the media data and representations of the relationships between and combinations of the media data which form the composition. Thus, compositions are stored separately from the media data to which they refer, and allow many compositions to use the same media data without duplicating it.

Figure 2:
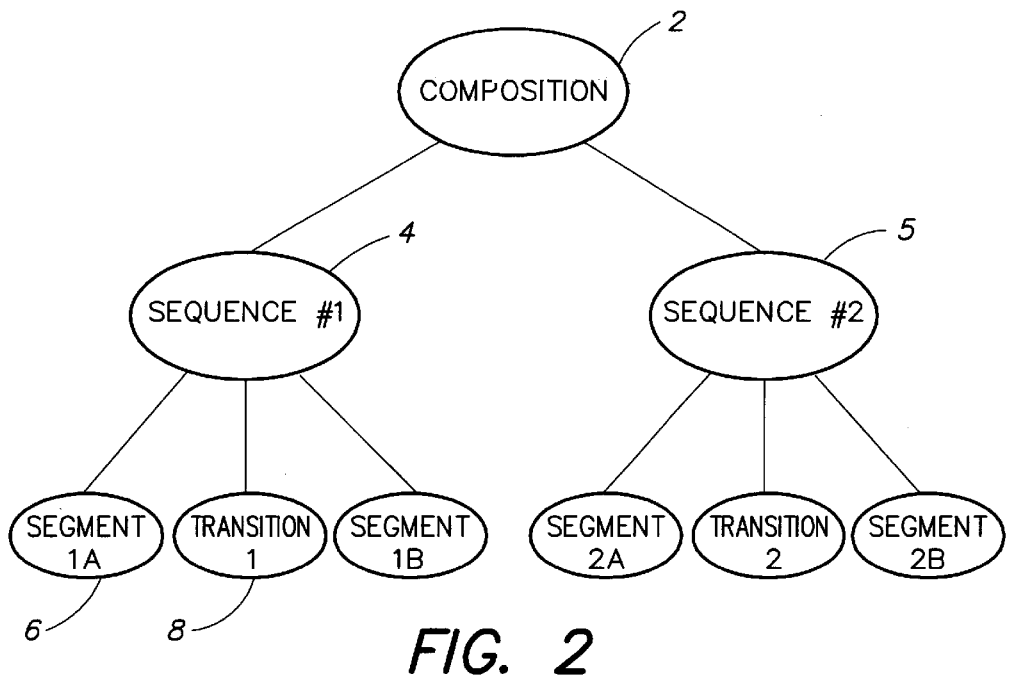
FIG. 2 is a diagram illustrating relationships between composition data structures in a composition.

Several types of data structures may be combined to form a composition. FIG. 2 illustrates one possible combination of components. Each segment 6 represents a section of media as a component of a composition. Although each segment also may represent more complex structures such as a sequence or a track group, which is discussed further below, a segment as referred to herein represents a single time-contiguous section of media in the context of a composition, unless otherwise specified. A segment includes a source identifier that identifies a source clip.

Transitions 8 are components which are located between two segments in a sequence of components, and indicate how a presentation should transition from displaying one segment to displaying the next segment.

A sequence 4 represents the serialization or concatenation in time of a collection of components. A sequence may define an ordered list of segments separated by transitions, and may itself be a segment within another sequence. The order of segments in a sequence defines the order of interpretation or "playback." Each sequence 4 may include a list of subcomponents and includes the subcomponent identifier of each subcomponent. An example of a playback system suitable for playing a composition is described in the Wissner Patent and the Peters application and U.S. Pat. No. 5,045,940, filed Dec. 22, 1989 by Eric C. Peters entitled VIDEO/AUDIO TRANSMISSION SYSTEM AND METHOD (the Peters patent), incorporated herein by reference. Also, a commercial playback system may be used for playing compositions that implements the Media Engine video playback system available from Avid Technology, Inc. that is incorporated in the Avid® AirPlay® MP playback server system. Media Composer from Avid Technology, Inc. is a suitable commercial system for playback as well as editing. Other commercial systems may be used.

A track group defines a parallel relationship between sequences or segments, which are defined by tracks within the track group. For example, one track within a track group may be an audio sequence or segment to be synchronized with a video sequence. Another track within the track group may be the video segment or sequence, and a third track within a track group may be a background video effect segment or sequence to be combined with the video segment or sequence. A composition is essentially a track group wherein the parallel tracks begin at a same point in time and end at a same point in time.

Figure 3:
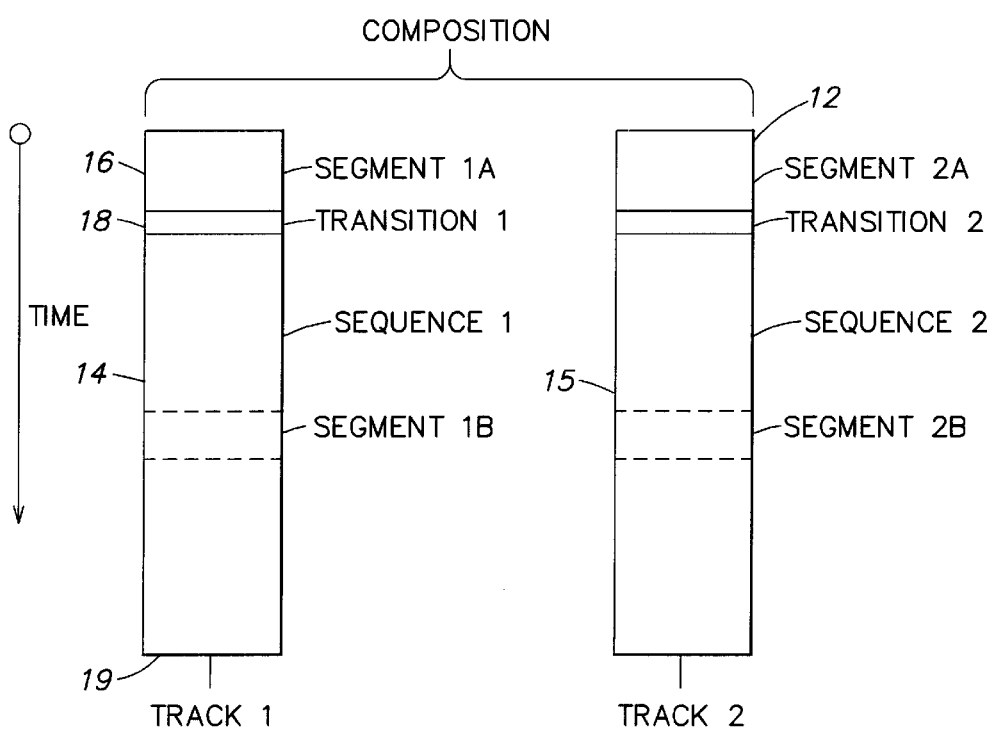
FIG. 3 is a diagram illustrating parallel and serial relationships between the composition data structures of FIG. 2.

FIG. 3 illustrates a representation of a composition 2, wherein sequences 4 and 5 (FIG. 2) are represented by parallel tracks 14 and 15, respectively. "Segment 1A" and "Segment 1B" in FIG. 2 correspond to segments 16 and 19 in FIG. 3. "Transition 1"(8 in FIG. 2) corresponds to transition 18 in FIG. 3. Each track 14 and 15 may be considered a logical player channel, and therefore is of a single media type. Because tracks 14 and 15 are subcomponents of a composition 2, the sequences 4 and 5 start at the same point in time and end at the same point in time.

Figure 4:
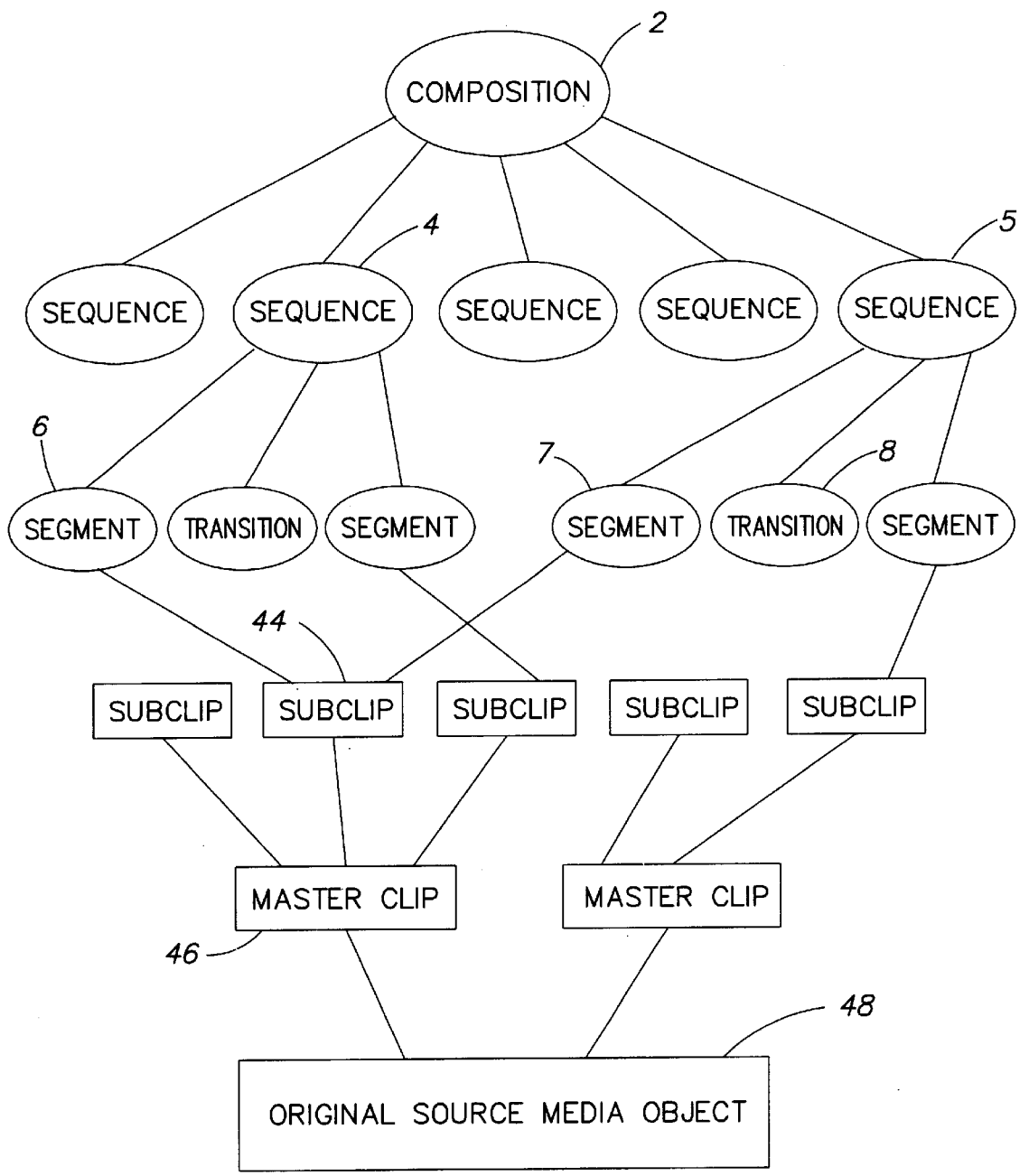
FIG. 4 is a diagram illustrating relationships between the source data structures of FIG. 2 and the composition data structures of FIG. 3.

FIG. 4 illustrates the relationship between source data structures and a media composition. The composition 2 includes 5 tracks, where each track is a sequence, including a sequence 4 that includes two segments and a transition. Sequence 4 includes a segment 6 that originates from a subclip 44. The subclip 44 originates from master clip 46 that originates from the physical media object 48. Source clip 44 is the source of segment 7 as well as segment 6. Segment 7 is a subcomponent of sequence 5. Thus, the subclip 44 is the source of two segments 6 and 7 which belong to two different sequences 4 and 5, respectively. Although not shown in FIG. 4, the subclip 44 could be the source of a segment used in an entirely different composition. The same kind of relationship between source data structures and composition data structures can be true at the master clip level also. A master source clip or a physical media object can be the source of multiple subclips linked to segments of multiple compositions.

Having now described the various kinds of source relationships and an embodiment of the data structures representing these relationships and how they are used to define a composition, an embodiment of source media modification will now be described.

Source media modification provides a simple, time-saving method of applying a single modification to several audio or video segments originating from a common source. The common source of a segment may be determined by applying a source relationship parameter (attribute), which may be defined by an editor, to the segment, as described in more detail below.

Figure 5:
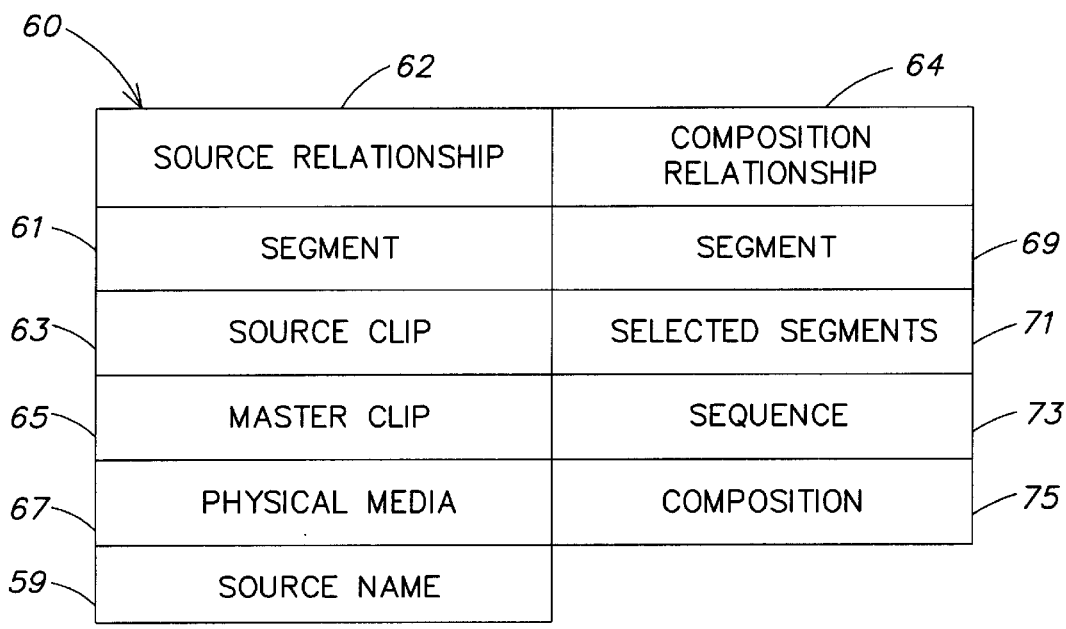
FIG. 5 is a table illustrating an embodiment of a relationship.

FIG. 5 illustrates a table 60 that lists possible source relationships for source media modification and possible composition relationships for composition media modification. The table 60 includes a source relationship column 62 and a composition relationship column 64.

The source relationship parameter can be defined as a segment relationship 61, a source clip relationship 63, a master clip relationship 65, physical media relationship 67, or a source name relationship 59. If the source relationship is defined as the segment relationship 61, the modification is applied only to the active segment during playback. An active segment, as used herein, means either the segment currently being edited on an editing system or a segment currently being played on a playback system. If the source relationship is defined as the source clip relationship 61, during playback the modification is applied to any segment, used within any composition on the system, that originates from the same source clip as the active segment. If the source relationship attribute is defined as a master clip relationship, during playback the modification is applied to any segment that directly or indirectly originates from the same master clip from which the active segment indirectly originates. If the source relationship attribute is defined to be the physical media relationship, the modification is applied to any segment that indirectly originates from the same physical media object from which the active segment indirectly originates.

For example, an editor may define the source relationship to be a source clip relationship. If an editor notices that a video segment representing film footage is too dark, the editor can increase the luminance of the segment to brighten the image. During playback, the increase in luminance may be applied to any video segment originating from the source clip.

If the source relationship attribute is defined to be the source name relationship, the modification is applied to any segment that shares the same name and same media type (i.e., audio or video) as the active segment. The source name relationship has particular application in media editing processes that incorporate an off-line and an on-line process. For example, typically, in an off-line digital video process, an editor makes rough edits to low resolution images of a sequence. Next, the editor batch digitizes the edited off-line sequence to produce an on-line sequence having high resolution images.

In an embodiment of this off-line to on-line digital video process, when the off-line sequence is made into an on-line sequence, a new master clip is created for each segment of the on-line sequence, from which each segment of the new on-line sequence directly originates, respectively. The source name relationship 59 allows a common attribute, i.e., name, to still exist between segments of the on-line sequence that otherwise may not still have a common source relationship due to the batch digitize. This is described below in more detail in connection to FIG. 6.

In an embodiment of source media modification, the scope of the effect of the modification may be restricted to only the sequence or composition to which the active segment belongs. Such a restriction may be an option for an editor or colorist selected through a user interface or may be a system option. Such a restriction may be considered as a combination of source media modification and composition media modification, which is described below.

For this restricted source media modification embodiment, the modification specified by a user will be applied to all segments that meet the requirement of being a part of the composition or sequence currently being edited, in addition to satisfying the source relationship. Whether the requirement is to be part of the current composition or part of the current sequence may be a user or system option. Restricting the effect of a source image modification ensures that a colorist or editor does not inadvertently modify a composition or sequence being edited or colorized by another user.

Composition media modification provides a method for an editor to apply a single modification to several segments within a composition. A composition relationship parameter (attribute) defines the ancestor of the active segment that is used to determine a common ancestor. The common ancestor is used to determine all descendants in the composition to which the modification is to be applied during playback.

Referring to the table 60 of FIG. 5, the composition relationship parameter may be defined to be a segment relationship 69, a selected segments relationship 71, a sequence relationship 73, or a composition relationship 75. If the composition relationship parameter is defined to be the segment relationship 69, only the active segment has the modification applied during playback. If the composition relationship parameter is defined to be the selected segments relationship 71, only the selected segments have the modification applied during playback. If the composition relationship parameter is defined to be the sequence relationship 73, all segments descended from or included in that sequence have the modification applied during playback. If the composition relationship parameter is the composition relationship 75, all segments of the composition have the modification applied during playback.

Figure 6:
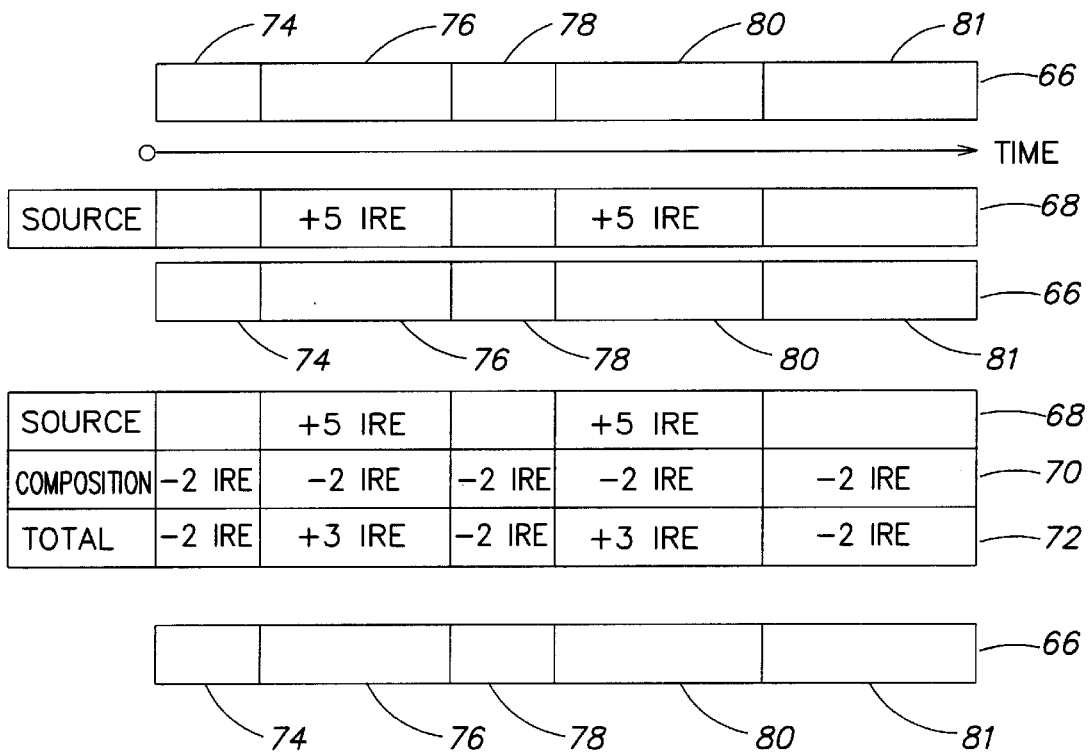
FIG. 6 is a block diagram illustrating an embodiment of effects of source color modification and composition color modification on segments within a sequence.

The combination of composition media modification and source media modification applied to a single segment will now be described with reference to FIG. 6. Although color modification is used in the following example, this example analogously applies to other types of audio and video modifications, for example, audio mixing.

Suppose that various footage has been shot by a film crew to be used in a movie. Included in this footage is some footage from scene A, footage from another scene B, footage from another scene C, and footage from yet another scene D. The film editors decide to use digital non-linear editing to combine the footage, make color modifications, and add special effects, etc. to produce the finished movie.

First, the editors create original digital sources from the film footage. Thus, an original digital source A, an original digital source B, an original digital source C, and an original digital source D are created. As discussed above, for each digital source created, a master source clip that represents the digital source is created also. Thus, a master source clip A, a master source clip B, a master source clip C and a master source clip D are created.

The editors then decide that the footage of scene B can be divided into two separate shots: shot 1 and shot 2. Thus, from the original digital source B, a digital source of shot 1 and a digital source of shot 2 are created. In response to the creation of the two new digital sources, a subclip of shot 2 is created to represent the digital source of shot 2, and a subclip of shot 1 is created to represent the digital source of shot 1.

The editors then decide to combine the footage of the various scenes together. Using a digital non-linear editor, the editors create a composition that includes a sequence 66 that includes a segment 74 originating from the master clip A, a segment 76 that originates from the subclip of shot 2, a segment 78 that originates from the master clip C, a segment 80 that originates from the subclip of shot 1, and a segment 82 that originates from the master clip D.

While viewing the various segments in the video display, an editors may notice that the segment 76 of shot 2 is too dark. The editors may decide to make a color modification to increase the luminance of this segment.

Using source color modification, the editors define the master clip relationship as the source relationship attribute. The editors then increase the luminance of the segment 76 of shot 2 by 5 IRE. Because the source relationship attribute was set to master clip relationship, upon playback both the segment 76 of shot 2 and segment 80 of shot 1, which both indirectly originate from the master clip B, have luminance increased by 5 IRE as shown in item 68 of FIG. 6.

The editor may then realize that all the segments of the sequence 66 are too bright. The editor may set the composition relationship attribute to a sequence relationship. The editor may then decrease the luminance of the active segment by 2 IRE. Because the composition relationship attribute is defined as a sequence relationship, all segments within the sequence 66 have their luminance decreased by two IRE during playback, as shown by row 70 in FIG. 7. Row 72 shows the combined color modification of both the composition color modification and the source color modification that is applied to each segment within the sequence 66 during playback.

In the above example, the source name relationship 59 would be useful if the sequence 66 is an off-line sequence and the above edits were made as part of an off-line process. If the off-line sequence 66 were then batch digitized, new master clips would be created for each of the segments 74, 76, 78, 80, 82 of the new on-line sequence. Consequently, an editor could no longer use the master clip relationship to specify a single edit to affect both segments 76 and segment 80. In an embodiment, assuming the name of the original master clip of scene b is Sceneb, the new master clips for segments 76 and 80 may be entitled Sceneb.new.01 and Sceneb.new.02, respectively. In this embodiment, the source name relationship 59 allows a system user to specify a single edit for both segments 76 and 80. Thus, if an editor notices that both the segments in the on-line sequence originating from scene b are too bright, the editor may specify a modification of −1 IRE for either segment 76 or 80 the modification of −1 IRE is applied to both segments.

For example, the editor first accesses segment 76, which originates from master source clip Sceneb.new.01, and specifies a color modification of −1 IRE. If the editor has the source name relationship attribute 59 selected, the system determines that the source name is Sceneb (where the .new.01 extension is ignored). The system identifies other segments originating from source data structure having a name Sceneb, and applies the image modification to the segments that satisfy the name requirement. In the above example, segment 80 satisfies the requirement, and the image modification is applied to it.

Figure 7:
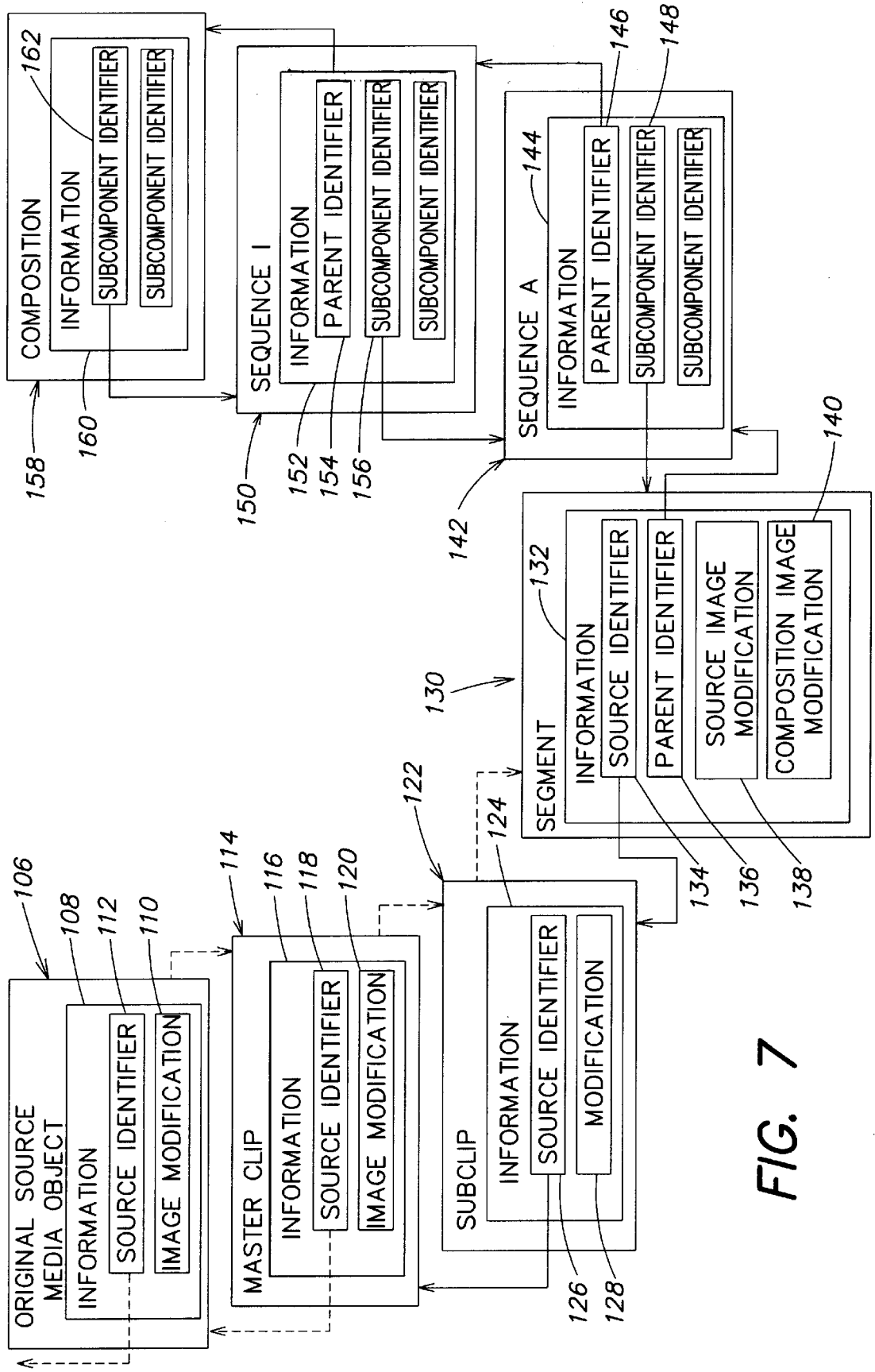
FIG. 7 is a block diagram illustrating an embodiment of source data structures and composition data structures.

FIG. 7 illustrates an embodiment of source and composition data structures that can be used for source and composition media modification. Although this embodiment describes image modification, embodiments of audio sample modification one within the scope of one of ordinary skill in the art of digital media editing. A segment 130 includes information 132 about the section of media that the segment 130 represents. This information 132 may include a source identifier 134, a parent identifier 136, a source image modification attribute 138, and a composition image modification attribute 140. The source and composition image modification attributes 138 and 140 may themselves be partitioned into a plurality of image modification attributes.

The source identifier 134 identifies the source data structure from which the segment 130 originates. The parent identifier 136 identifies the parent of the segment in a composition 158. The source image modification attribute 138 represents a source image modification to be applied to the segment 130 during playback. The composition color modification attribute 140 defines a composition image modification to be applied to the section of media represented by the segment 130 during playback. It should be noted that if a source or composition image modification is not defined for a data structure, an image modification attribute may be a null value, or the image modification attribute may not be included in a data structure.

In FIG. 7, the source identifier 134 points to a subclip data structure 122. The subclip data structure 122 includes information 124 about the section of media that the subclip represents. The information 124 includes a source identifier 126 and may include a source image modification attribute 128, depending upon whether the source image modification was defined for the subclip 122 during an editing session. The source identifier 126 of the subclip 122 refers to a master clip data structure 114. The master clip 114 includes information 116 about the digital media that the master clip 114 represents. The information 116 may include a source identifier 118 and may include an image modification attribute 120. If the master clip 114 represents a digitally created digital source, the source identifier 118 may be a null value indicating that the master clip does not originate from another source.

The source identifier 118 of the master clip 114 may refer to a physical media object 106. The physical media object 106 includes information 108 that describes the physical media that the physical media object 106 represents. The information 108 may include a source identifier 112 and may include an image modification attribute 110. The information 108 includes a source identifier 112 if the physical media that the physical media object represents was created from another physical media. For example, the physical media may be a video tape that was created from a film through a telecine process. In such case, the source identifier 112 refers to the physical media object that represents the film.

In the example of FIG. 7, the parent identifier 136 of the segment data structure 130 refers to a first sequence data structure 142. The first sequence 142 includes information 144 about the first sequence 142. The first sequence information 144 may include a parent identifier 146 and a subcomponent identifier 148. The first sequence information 144 would not include a parent identifier 146 if the sequence 142 is itself a composition, which is not the case in FIG. 8. The first sequence information 144 may include an ordered list of subcomponents of the first sequence 142, where the order of the subcomponents determines the order in which the subcomponents are played during playback. For each subcomponent, the information 144 may include a subcomponent identifier 148.

In the illustration of FIG. 7, the subcomponent identifier 148 identifies segment 130. The parent identifier 146 identifies a second sequence 150 of which the first sequence 142 is a subcomponent. The second sequence 150 includes information 152 about the sequence 150. The second sequence information 152 includes information analogous to that described for first sequence 142, including a parent identifier 154 that refers to the composition data structure 158. The second sequence information 152 would not include a parent identifier 154 if the second sequence 150 is itself a composition which is not the case in FIG. 8. The information 152 also includes an ordered list of subcomponents, the order of the subcomponents determining the order of playback of the subcomponents during playback. For each subcomponent, the information 152 includes a subcomponent identifier 156. The subcomponent identifier 156 identifies first sequence 142 as a subcomponent of the second sequence 150. The parent identifier 154 identifies the composition 158 as the parent of sequence 150.

Composition 158 includes information 160 about the composition 158. The composition information 160 includes the sequences of each track of the composition, wherein the sequences are subcomponents of the composition 158. For each subcomponent of the composition 158, the composition information 160 includes a subcomponent identifier 162. The subcomponent identifier 162 identifies sequence 150 as a subcomponent of composition 158.

Figure 8A:
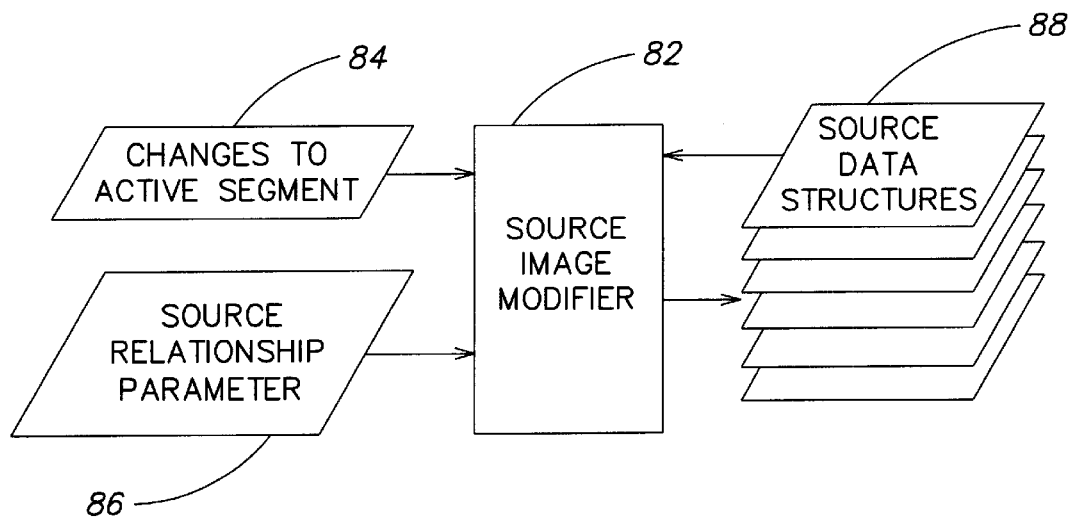
FIG. 8a is a data flow diagram illustrating an embodiment of a source color modifier.

FIG. 8A is a dataflow diagram that illustrates how the source data structures illustrated in FIG. 7 can be used to implement source image modification during an editing session. A source image modifier 82 receives user-defined image modifications for an active segment 84 and a source relationship parameter 86. Using the user defined image modification 84 and the attribute 86, the source image modifier 82 accesses the source data structures 88 and modifies the source data structures 88 in accordance with the image modification 84 and the source relationship parameter 86.

Figure 9:
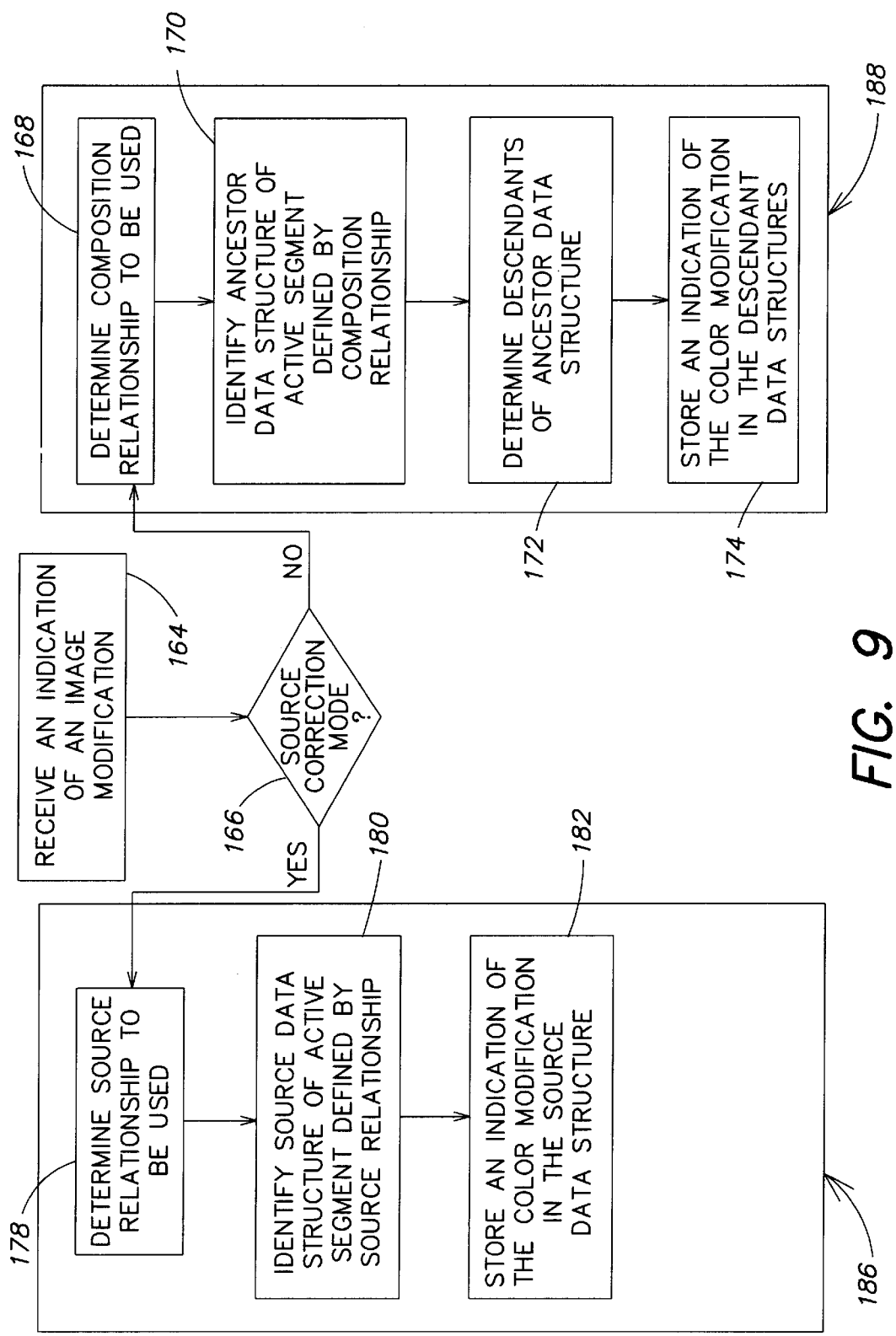
FIG. 9 is a flow chart illustrating an embodiment of an editing process implementing composition color modification and a source color modification.

FIG. 9 is a flowchart illustrating an editing process implementing source image modification 186 and composition image modification 188. With reference to FIG. 9, the implementation of source image modification 186 by the source image modifier 82 during an editing session will now be described. First, in step 164, an indication of an image modification is received. Next, in step 166, an editor may determine whether the image modification is a source image modification or a composition image modification. Such a determination is made, for example, by accessing an indication of the image modification mode selected by an editor. If it is determined that source image modification shall be applied, at the next step 178, the source image modifier determines the source relationship to be used to determine a common source of the active segment and other segments on the system. Determining the source relationship to be used can be accomplished by either accessing a default source relationship parameter or by receiving a source relationship parameter defined by an editor.

Figure 10:
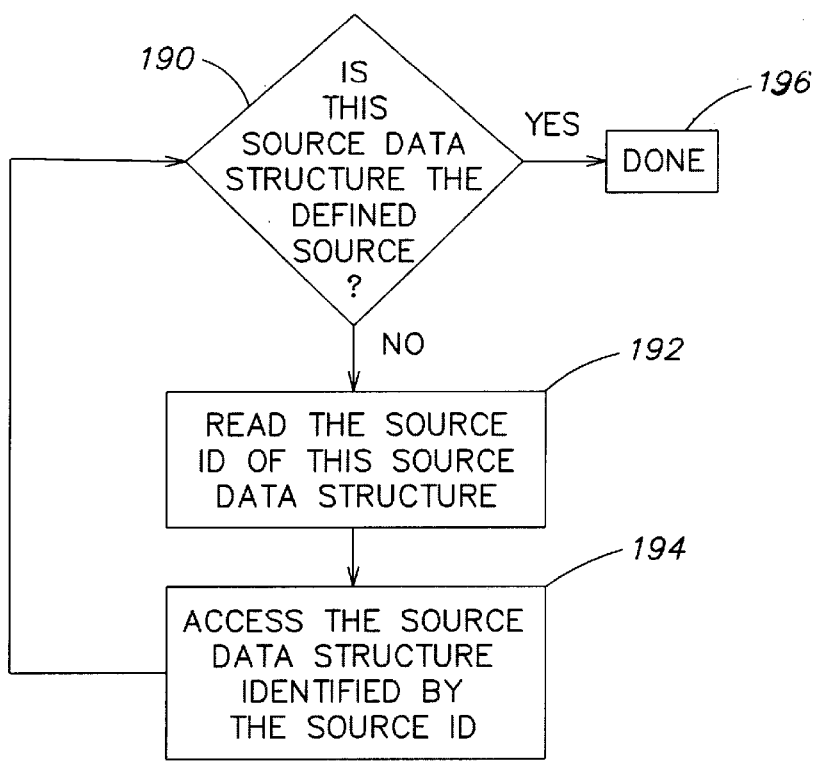
FIG. 10 is a flow chart illustrating an embodiment of a process of identifying a source data structure defined by a source relationship attribute.

Next, in step 180, the source image modifier identifies a source data structure of the active segment defined by the source relationship. FIG. 10 is a flowchart that defines in more detail the step 180 of identifying the source data structure. First, in step 190, the source image modifier 82 determines whether the current source data structure is the source data structure defined by the source relationship. The first time through the loop defined by steps 190–194, the current source data structure is the active segment. If the current source data structure is the defined source data structure, then the step of identifying the source data structure of the active segment is done, as illustrated in step 196. If the current source data structure is not the defined source data structure, then in the next step 192, the source image modifier 82 reads the source identifier of the current source data structure. In step 194, the source image modifier then accesses the source data structure identified by the source identifier. Steps 190–194 are repeated until the source data structure defined by the source relationship attribute is identified.

Returning to the flowchart of FIG. 9, in the next step 182, the source image modifier stores an indication of the source image modification in the source data structure identified in step 180.

In an alternative embodiment of source media modification, modifications may be stored as an entry of a composition source table, as opposed to being stored in a source data structure as described above. FIG. 17 is an example illustration of a composition source table 500. Each entry 502 in the composition source table include two pieces of data: the identification of a source data structure 504 for which a source modification of a segment within the composition is defined; and an attribute 506 representing the source modification. If a source modification is defined for a segment within the composition, an entry may be stored in the composition source table 500 identifying the source data structure from which the segment originates in accordance with the source relationship parameter of the segment, and the attribute representing the modification.

The composition source table allows a source media modification to be shielded from other compositions on the system that use material from the defined source. The source media modification may be defined specifically for segments of the same composition that originate from a common source, but not for all segments on the system originating from the common source. Thus, other editors are not forced to implement modifications on a composition that they are editing where the modification was defined by a different editor working on a different composition.

Another benefit of using the source composition table 500 is that it provides an editor with the option of not applying a source media modification to the composition. An editor may select whether the composition source table 500 is to be activated. For example, if a colorist defines a series of source color modifications for a composition, the source data structures and the color modifications are stored in entries of the composition source table 500 as described above. At a later point in time, an editor may access the composition, but not activate the table, and thus not apply the modifications defined therein.

In this alternative embodiment, for an active segment during playback, the modification system may first determine if there is a source modification defined for the active segment data structure. If a modification is defined for a segment data structure, the modification may be applied. If no modification is defined in the active segment data structure, the composition source table 500 may be accessed. If it is determined that there is an entry for the subclip from which the active segment originates, the source modification defined for the subclip is applied to the active segment. If it is determined that no entry for the subclip is present in the table 500, it is determined whether the table 500 includes an entry for the master clip from which the segment originates. If it is determined that there is an entry for the master clip from which the active segment originates, the source modification defined for the master clip is applied to the active segment. If it is determined that no entry for the master clip is present in the table, it is determined whether the table includes an entry for the physical media object from which the segment originates. If it is determined that there is an entry for the physical media object from which the active segment originates, the source modification defined for the physical media object is applied to the active segment. Although the alternative embodiment is described above with respect to the source relationship common attribute, this embodiment also applies to other common attributes, such as the formatting attributes and color attributes described above.

For example, instead of a composition source table, a composition format table may be maintained. An entry in the format table includes two pieces of data: the identification of a common format attribute; and an attribute representing the modification defined for segments of the composite having the format attribute. When a modification is defined for a segment within the composition, an entry may be stored in the composition format table identifying the common format attribute for which the modification was specified. The common format attribute may be determined from a default common attribute parameter or a user-defined common attribute parameter.

In another alternative embodiment of source modification, the source modifier 82 accesses every segment on the system that originates from a source data structure 88 determined from the source relationship parameter 86 of the active segment 84. The source image modifier 82 then modifies each of accessed segments, respectively, with the modification.

In an aspect of this alternative embodiment, the source modifier 82 only accesses and modifies segments in the current sequence or composition of the active segment 84 that satisfy the source relationship parameter 86. A system option or user option may be used to determine whether the modification is restricted to the sequence or the composition. This alternative embodiment of source image modification analogously applies to other types of common attributes image modification, where a modifier accesses every segment on the system that shares the common attribute and modifies each segment with the modification. The common attribute may be determined from a default or user-defined common attribute parameter.

Figure 8B:
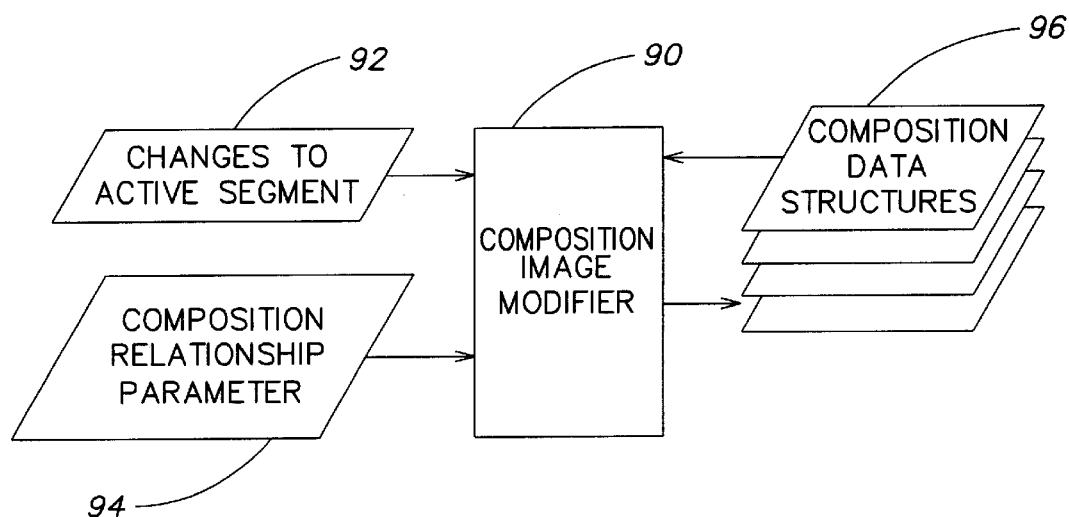
FIG. 8b is a data flow diagram illustrating an embodiment of a composition color modifier.

FIG. 8B is a dataflow diagram illustrating how composition image modification can be implemented by a composition image modifier 90. The composition color modifier 90 receives image modifications 92 to be applied to the active segment. The composition image modifier 90 then accesses a default relationship attribute or receives a composition relationship attribute 94 defined by an editor. The composition color modifier then accesses the composition data structures 96 and modifies the composition data structures 96 in accordance with the image modification 92 and the relationship attribute.

Referring again to FIG. 9, an implementation of composition image modification implemented by the composition image modifier 90 will now be described. As described above with respect to source image modification, the first step is step 164 of receiving an indication of an image modification. The digital media editing system then determines whether source image modification or composition image modification is to be applied in step 166.

If composition image modification is to be applied, in the next step 168, the composition image modifier determines the composition relationship to be used. The composition relationship is defined by either a default composition relationship parameter or a composition relationship parameter defined by an editor.

In the next step 170, the composition image modifier identifies the ancestor data structure of the active segment defined by the composition relationship parameter.

Figure 11:
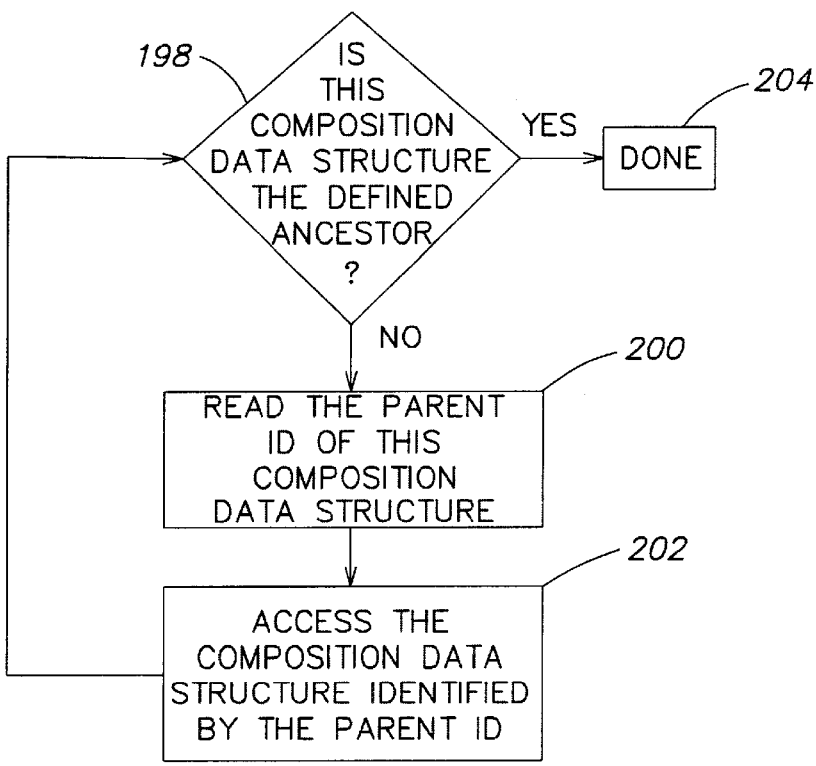
FIG. 11 is a flow chart illustrating an embodiment of a process of identifying a composition data structure defined by a composition relationship attribute.

FIG. 11 provides a more detailed flowchart of step 170. First, in step 190, the composition image modifier determines whether the current composition data structure is the ancestor data structure defined by the composition relationship attribute. The first time through the loop defined by steps 198–202, the current composition data structure is the active segment. If the current composition data structure is the defined ancestor data structure, then the step 170 of identifying the ancestor data structure is done, as illustrated in step 204. If the current composition data structure is not the defined ancestor, the next step 200 reads the parent identifier of the current composition data structure. In the next step 202, the composition image modifier accesses the composition data structure identified by the parent identifier. Steps 198–202 are then repeated until the ancestor data structure defined by the composition relationship attribute is identified.

Returning to FIG. 9, in the step 172, the composition image modifier determines the descendants of the identified ancestor data structure, for example, by accessing the subcomponent list of the identified data structure and accessing the subcomponent identifiers for each subcomponent, and traversing downward in the composition from the identified ancestor data structure. In step 174, for each identified descendant or subcomponent of the identified ancestor data structure, an indication of the image modification is stored in a descendant's data structure. Traversing a composition to perform editing operations on components is described in the Wissner patent.

Figure 12:
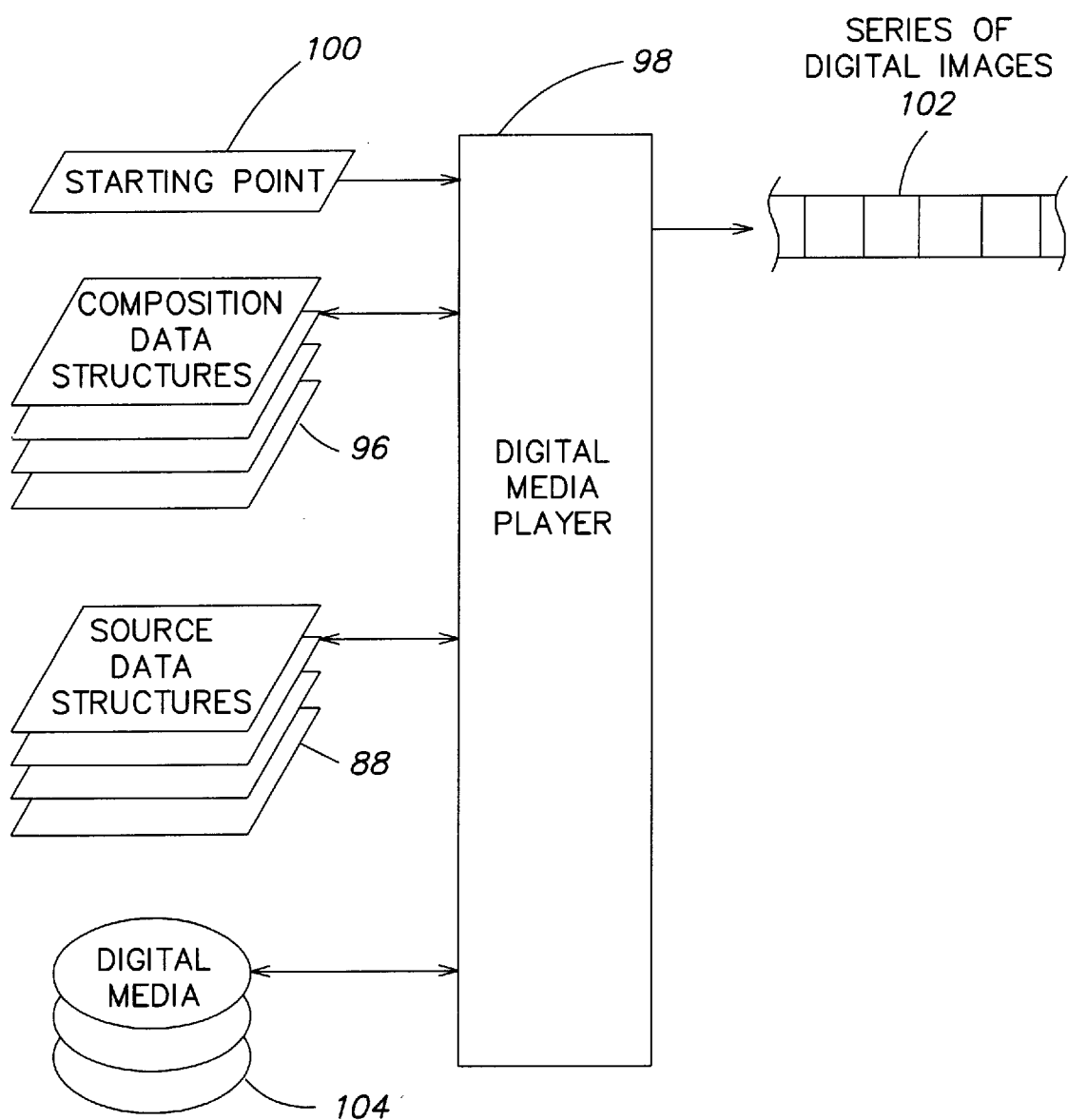
FIG. 12 is a data flow diagram illustrating an embodiment of a media player implementing source color modification and composition color modification.

Another aspect of source and composition media modification is the application of the modifications to segments within a composition during playback. FIG. 12 is a dataflow diagram that illustrates an implementation of source and composition image modification during playback. Although this embodiment describes image modification, embodiments pertaining to audio sample modification are within the scope of those skilled in the art of digital media editing. A digital media player 98 receives an indication of a starting point 100 within a composition. The starting point 100 may be the beginning of the composition by default or may be defined by input from an editor on a user interface. The digital media player 98 accesses composition data structures 96 to properly synchronize the playing of sections of a digital media.

When a segment is identified within the composition, the digital media player identifies source data structures 88 from which the active segment originates, and determines whether any source image modification attributes are defined for these source data structures 88. The digital media player also uses the source data structures 88 to determine the digital sources from which the digital media should be accessed. The digital media player also determines whether the active segment has a composition image modification. The digital media player then applies the source image modification and the composition image modification to the active segment. This process is repeated for every segment of the composition, or every segment included in a portion of the composition selected by the user, such that a sequence of digital images 102 is produced as defined by the composition. A playback system may apply image modification sequentially on a segment, one digital image at a time. More specifically, a playback system may apply image modification sequentially on an digital image. Such a system is described in a U.S. patent application entitled "Color Modification on a Digital Nonlinear Editing System" (the Cacciatore Application), application Ser. No. 09/293,259 filed Apr. 15, 1999 by Ray Cacciatore and Rob Gonsalves.

FIG. 13 is a flowchart that illustrates an implementation of source and composition image modification during playback. In step 206, the digital media player 98 accesses the next segment in a composition. Next, in step 208, the digital media player 98 determines whether a source image modification attribute is defined for this data structure. If there is a source image modification attribute defined for this data structure, the digital media player determines whether there is a temporarily stored source image modification attribute for this active segment.

It should be noted that the first time through the loop defined by steps 208–216, the source data structure is the active segment. For this reason, the first time through the loop defined by steps 208–216, at step 210 there is not a temporarily stored image modification attribute for the active segment. Alternatively, for the first time through the loop defined by steps 208–216, step 210 may be skipped. The data structure that holds the temporarily stored source image modification attribute for the active segment also may be initialized between steps 206 and 208.

Returning to the flowchart of FIG. 13, if there is no temporarily stored source image modification attribute, in step 212 the digital media player temporarily stores the source image modification attribute for the active segment. If the digital media player determines in step 210 that there is already a temporarily stored source image modification attribute for the active segment or determines in step 208 that there is no image modification attribute defined for this data structure, the digital media player proceeds to step 214. In step 214, the digital media player determines whether there is a source data structure from which the current source data structure originates.

If the media player determines that there is a source data structure from which the current source data structure originates, the media player proceeds to step 216. In step 216, the media player accesses the source data structure from which the current source data structure originates. Steps 208–216 are repeated until there is no source data structure from which the current source data structure originates.

If there is no source data structure from which the current source data structure originates, the digital media player proceeds to step 218. In step 218, the digital media player determines whether there is a temporarily stored source image modification attribute for the active segment. If there is a temporarily stored source image modification for this segment, the digital media player in step 220 applies the temporarily stored source image modification attribute to the active segment.

After applying the temporarily stored source image modification attribute to the active segment, or after determining that there is no temporarily stored source image modification attribute for this segment, the digital media player proceeds to step 222. In step 222, the digital media player determines whether there is a composition image modification defined for the active segment. If there is a composition color modification defined for this segment, the digital media player proceeds to step 224 where it applies the composition image modification to the active segment.

After applying the composition image modification to the active segment or after determining that there is no composition image modification to find for this active segment, the digital media player then proceeds to step 206 where it accesses the next segment in the composition. Steps 206–224 are repeated until the entire composition or the portion of the composition defined by a user has been played.

FIGS. 14a–14d illustrate an example embodiment of a user interface for digital media modification. Although not shown in FIGS. 14a–14d, various audio editing tools and controls may be part of the user interface. A three-image display 270 (FIGS. 14a and 14b) includes a current image display 229, a previous image display 228, and a next image display 230. The current image display 229 represents an active segment of a sequence, and the previous image display 228 and the next image display 230 represent the previous and next segments of the sequence, respectively. A control panel, for example the control panel 272 of the current image 229, may be associated with each image display. For the current image display, for example, the control panel may include a previous segment button 232, a next segment button 234, a previous unmodified segment button 236, a next unmodified segment button 238, a play button 240, and a stop button 242. Each image may also include a scroll bar, for example scroll bar 261 of the current image 229. Each scroll bar may include a position indicator 262 which indicates the temporal position of the current image 229 within the segment that it represents.

Figure 14A:
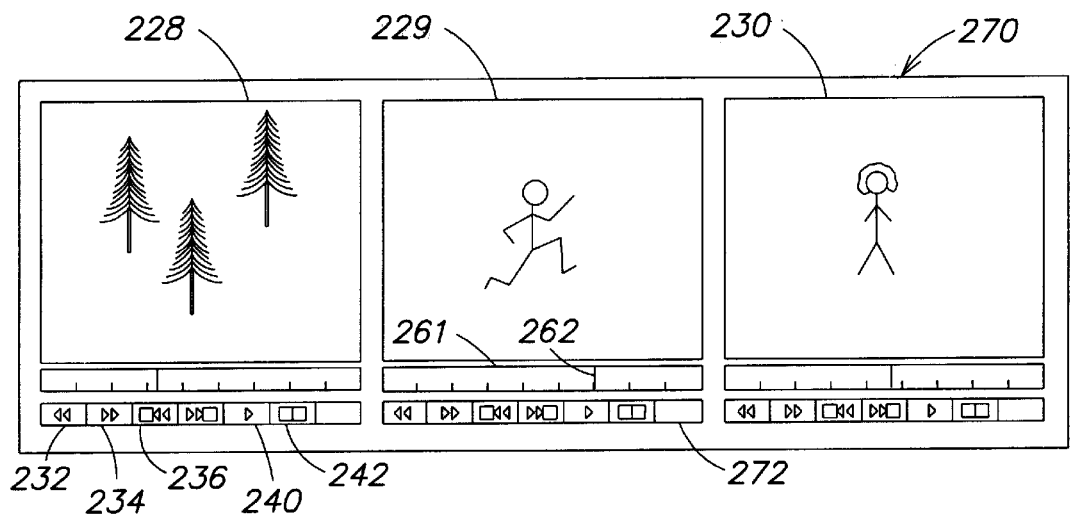
FIGS. 14a–14d illustrate an example embodiment of a user interface for color modification.
Figure 14B:
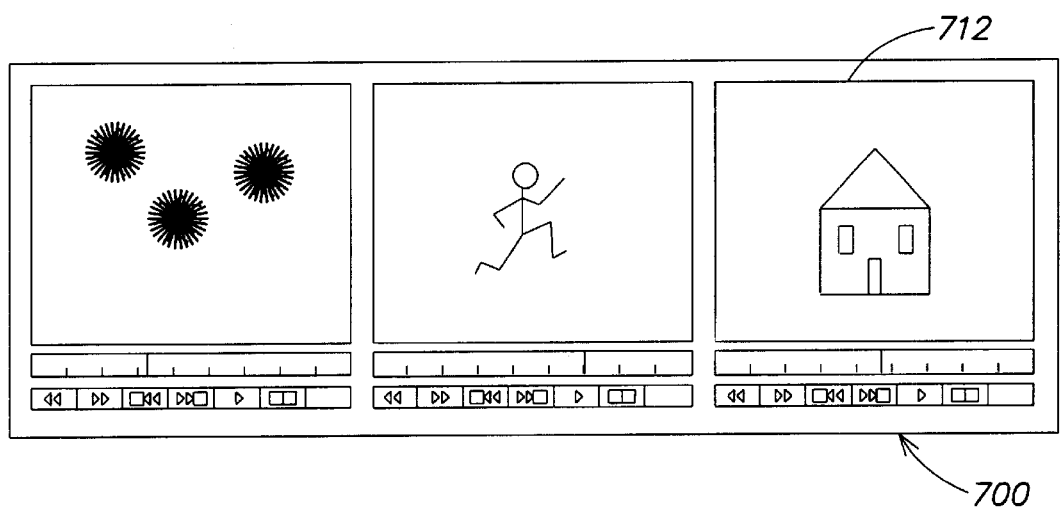
Figure 14C:
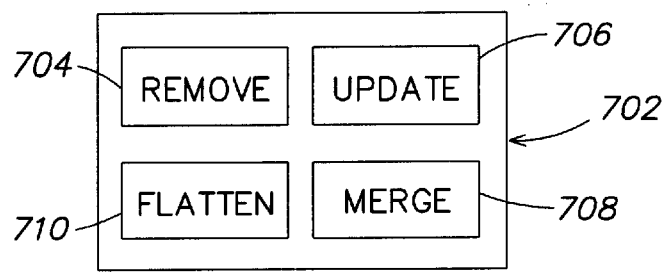

The three image display 270 allows the editor to see the effects of image modification. If selected, the previous segment button 232 replaces the active segment with the previous segment in the current image display 229. In the example of FIGS. 14a and 14b, if the previous segment button 232 is pressed, a digital image from the previous segment appears in the current image display 229. Analogously, if the next segment button 234 is selected, a digital image from the next segment appears in the current image display 229.

During an editing session, various image modifications may be defined. Depending on the common attribute parameter chosen during the editing session, various segments of the sequence being represented by the three image display 270 may be affected by the image modification. The previous unmodified segment button 236 and the next unmodified segment button 238 allow an editor to view the effects of image modification in an efficient manner.

If the previous unmodified segment button 236 is selected, a previous segment closest in time to the active segment that has not yet had an image modification applied replaces the active segment in the current image display 229. The unmodified segment buttons allow an editor to quickly determine which segments of a sequence have not been modified. Rather than having to use the next and previous buttons 232 and 234 repeatedly to traverse all the segments in a sequence, even when the segments have already been modified, an editor can simply press buttons 236 and 238 to view the closest unmodified segments.

In an embodiment of the user interface, the user interface includes a second display window, for example, a second 3-image display 700 (FIG. 14b). An editor or colorist may use images from both 3-image display 270 and 3-image display 700 to edit or colorize images from each display. For example, an editor may color match a color from image display 712 (FIG. 14b) into current image display 229 (FIG. 14a). Color matching is described below in more detail. Another example would be to add the image of previous image display 228 to the end of the sequence being displayed in 3-image display 700, and possibly define a blend between the last image of the sequence of 700 and the image of the previous image display 228.

In another embodiment of the user interface, a common attribute tool panel 702 (FIG. 14c) is included. The tool panel 702 may include a remove button 704, an update button 706, a flatten button 710 and a merge button 708. The remove button 704 allows a system user to remove all previous modifications specified for a particular common attribute from the current sequence or composition, respectively. A user may select the remove button 704, and then be presented with a screen, pull-down menu, dialog box, etc., that provides a list of common attributes for which the remove may be specified. The user may then select the common attribute resulting in all previously applied modifications that were specified for the selected common attribute being removed from the current sequence or composition.

For example, suppose a user previously made modifications while editing the current sequence, specifying the physical media source relationship as the common attribute, and the modifications modified several segments of the current sequence. If the user selects the remove button, and then selects the physical media source relationship as the common attribute, all the previous modifications specified for the physical media relationship are removed or reversed from the segments of the current sequence modified above.

The update button 706 allows a user to apply previous modifications made during an editing session to new segments that have been added to a sequence or composition since the modifications were made. For example, earlier in an editing session a user may have lowered the luminance of all segments in a video sequence that share a common source name by 10 IRE. A user may have then added a new segment to the sequence that also shared the common source name for which the luminance increase was previously applied. Selecting the update button 706 applies the previously defined luminance increase to the newly added segment sharing the common source name.

The flatten button 710 may be used to return a specified common attribute parameter to a default common attribute parameter. For example, a user may want to be sure that certain edits only apply to the active segment. Commonly, the default source attribute parameter and default composition attribute parameter are defined as the segment relationship. Thus, selecting the flatten button 710, the source relationship attribute parameter and a composition relationship parameter returns to the segment relationship.

The merge button 708 can be used when combining segments from one sequence with segments from another sequence. A typical situation in which this function would be used is when an editor, who has trimmed and combined several video segments in a sequence, wants to incorporate the color modifications made by a colorist to at least one of the video segments of the editor's sequence. In such an example, the colorist may have copied the original sequence that the editor had started with, and made several color modifications to each of the segments. The merge button allows several changes made by both the editor and colorist to be combined in a single step. However, when these several changes are combined, conflicts may occur. For example, the editor may have specified a color change that increases the hue of all images in the sequence, while on the other hand the colorist may have specified a color modification that decreases the hue of all segments within the sequence.

There are several ways by which these conflicts may be resolved. One of these ways may be assigned as a default, selected as a system option, or selected by a user. Thus, the ways in which the merge button may resolve conflicts includes: automatically selecting the image modification specified by the destination sequence to which the source sequence is being applied; automatically selecting the image modification specified by the source sequence, which is being applied to the destination sequence; automatically selecting the image modification which came first or last in time, in accordance with a time stamp associated with the image modification; or prompting the user to select between the conflicting image modifications.

Figure 14D:
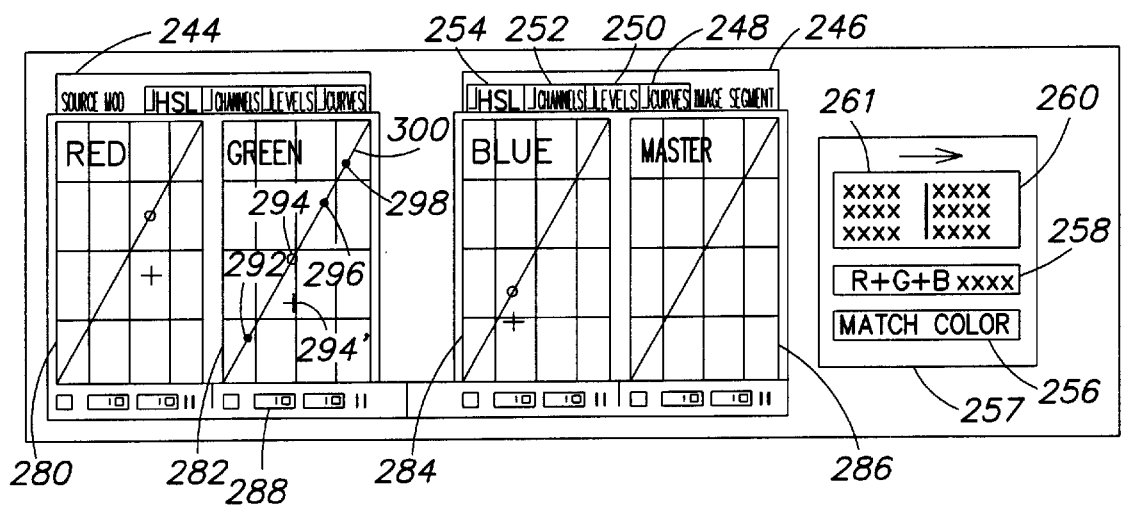

An example embodiment of a user interface, shown in FIG. 14*d*, using color modification and source and composition relationships as common attribute parameters, will now be described.

In an example embodiment using color modification and source and composition relationships as common attribute parameters, color function buttons allow an editor to select function screens for both source and composition color modification. For example, tab 244 allows a user to select color functions for source color modification, and tab 246 allows a user to select functions for composition color modification. The color function screens allow an editor to perform specific color modification functions. Color function buttons may include an HSL button 254, a channels button 252, a levels button 250, and a curves button 248. The HSL button 254 brings up an HSL function screen that allows a user to define changes to pixel colors in HSL color space, including defining color modifications to pixel colors as a function of the luma of a pixel. Channels button 252 allows a user to access a channels screen, where channels in this context refers to the red, green, and blue components of an RGB component format. The RGB screen allows a user to modify values of the RGB components as a function a component the RGB components or combinations of the RGB components.

The levels button 250 allows a user to access a levels screen in which a user can determine the effects of RGB color modifications on the luma of the pixel, and to alter the luma of the pixel as a function of the luma of the pixel. Example embodiments of the color modifications available on a levels screen is described in U.S. Patent Application "Apparatus and Method for Generating and Displaying Histograms of Color Images for Color Correction," by Robert Gonsalves, Ser. No. 09/293,023, filed on Apr. 16, 1999.

The curves button 248 allows a user to access a curves screen. An example embodiment of a curves screen is illustrated in user interface 400, in which the curves button has been selected. The curves screen allows a user to define color modifications for a red, green, or blue component of a color, or for all three components of the color. The curve screen includes a red graph 280, a green graph 282, and a blue graph 284 for defining the functions of the individual components, and a master graph 286 for defining a function that is applied to all three color components. In each graph, the horizontal axis represents an input value of the function, while the vertical axis represents the output value of the function. Each graph may include control points that if added, moved or deleted alter a curve representing the function, thereby altering the function.

For example, for the green graph 282, by altering any of the control points 292, 294, 296, and 298, the green curve 300 is altered, thereby redefining a function for the green component. The new values for the functions are determined using interpolation, for example, linear interpolation, cubic splines, or Bezier curves.

In an example embodiment, the curve screen of the user interface 400 allows a user to color match using colors from images of the three-image display 270, text input from a text entry field such as 288, or other color sources. For example, a user may select a color from the image displayed in the next image display screen 230 and apply it to the image in the current image display screen 229. The curve screen allows the user to preview the effect of adding a color to an image, using the graphs 280, 282, 284, and 286. The curve screen also provides a color matching gadget 257 to assist an editor in color matching. The color matching gadget 257 includes an input swatch 261 and an output swatch 260. The RGB values of the selected colors for color matching are displayed in the swatches. The RGB graphs 280, 282, 284, and 286 allow the user to preview these colors without committing to a change in the functions represented by these graphs.

Typically, an editor picks from the current image display 229 for the source color, the value of which is displayed in the input color swatch 261, and picks from a known good color, the value of which is displayed in the output color swatch 260. A known good color may be provided by a color palette, or from another image, such as the image displayed in the previous image display 228 or the next image display

230. The user may select how they would like to match the color. There may be eight choices, including: master, R+G+B, R+G, G+B, B+G, Red, Green, Blue. If an editor picks R+G+B as the match type, as displayed in selection box 258 of the user interface 400, and hits the match color button 256, then a new control point is added to each of the red, green, and blue graphs 280, 282, and 284, respectively. Hash marks or some other indicator on the graphs represent the changes to those graphs resulting from the color match. For example, the hash mark 294' on the green graph 282 represents a change in the value of the control point 294, which alters the green component function.

In an embodiment of color matching, the hue and saturation of the output color are automatically adjusted to match how objects behave under natural lighting environments. For example, if an object is illuminated from natural light, the ratios between the RGB values of the object remain proportional from areas of the object highly illuminated by the light to darker areas of the object not illuminated by as much light.

Natural color matching operates in the following manner. Given a source color, $R_S$, $G_S$, $B_S$, for example, the color represented in the input color swatch 286, and a destination color $R_D$, $G_D$, $B_D$, for example, the output color represented by the output color swatch 260, an adjusted destination color, $R'_D$, $G'_D$, $B'_D$ is determined.

The luminance of the source color, $Y_S$ may be defined as:

$$Y_S = 0.299 \cdot R_S + 0.587 \cdot G_S + 0.114 \cdot B_S \qquad \text{Equation 1}$$

Input red/luminance ratio, $\rho_{RS}$, input green/luminance ratio, $\rho_{GS}$, and input blue/luminance ratio, $\rho_{BS}$, may be defined as:

Equation 2:
$$\rho_{RS} = \frac{R_S}{Y_S}$$

Equation 3:
$$\rho_{GS} = \frac{G_S}{Y_S}$$

Equation 4:
$$\rho_{BS} = \frac{B_S}{Y_S}$$

The luminance of the destination color, $Y_D$, may be defined as:

$$Y_D = 0.299 \cdot R_D + 0.587 \cdot G_D + 0.114 \cdot B_D \qquad \text{Equation 5}$$

Output red/luminance ratio, $\rho_{RD}$, output green/luminance ratio, $\rho_{GD}$, and output blue/luminance ratio, $\rho_{BD}$, may be defined as:

Equation 6:
$$\rho_{RD} = \frac{R_D}{Y_D}$$

Equation 7:
$$\rho_{GD} = \frac{G_D}{Y_D}$$

Equation 8:
$$\rho_{BD} = \frac{B_D}{Y_D}$$

Adjusted red/luminance ratio, $\rho'_{RD}$, adjusted green/luminance ratio, $\rho'_{GD}$, and adjusted blue/luminance ratio, $\rho'_{BD}$, may be defined as:

Equation 9:
$$R'_D = \frac{\rho_{RD}}{\rho_{RS}} R_S = \frac{Y_S}{Y_D} R_D$$

Equation 10:
$$G'_D = \frac{\rho_{GD}}{\rho_{GS}} G_S = \frac{Y_S}{Y_D} G_D$$

Equation 11:
$$B'_D = \frac{\rho_{BD}}{\rho_{BD}} B_D = \frac{Y_S}{Y_D} B_D$$

In a color difference space, such as YCbCr, the Y value represents the luminance and the two color components, CbCr, represent the chrominance. Chrominance may be defined by two values: hue, which is defined by the angle of the vector $(0,0) \rightarrow (Cb, Cr)$, and saturation which is the magnitude of this vector and may be defined as $\sqrt{C_b^2 + C_r^2}$.

Figure 15:
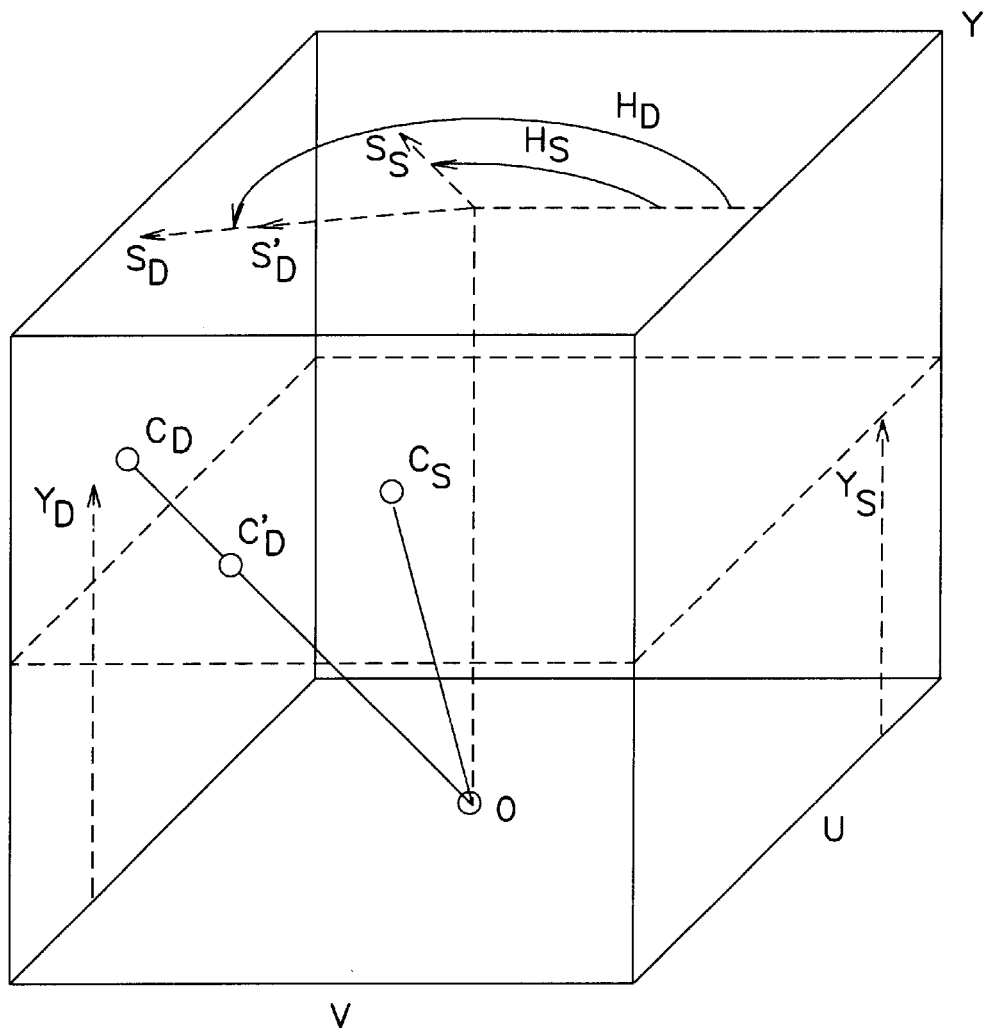
FIG. 15 is an illustration describing operation in the HSL color space.

FIG. 15 illustrates the effect of natural color matching in HSL space. By matching the ratios of RGB to luminance, a resulting modified image adopts the hue $H_D$ of the specified destination color, $C_D$ (that has luminance $Y_D$), but maintains the luminance $Y_S$ of the source color $C_S$ (that has hue $H_S$). If a destination vector is drawn from the black point O to the destination color $C_D$, the adjusted color, $C'_D$, is located at the intersection of this destination vector and a plane defined by the source luma $Y_S$. The saturation $S'_D$ of the adjusted color, $C'_D$, also differs from the saturations of the destination color $S_D$ and the source color $S_S$ and is the magnitude of an adjusted vector that may be defined as $\sqrt{C'^2_b + C'^2_r}$.

Natural color matching may be used to match any combination of the red, green, and blue components. R+G+B matching was described above. Natural matching with the master curve affects luminance only. Six other combinations that can be used are: R+G, G+B, B+G, Red, Green, and Blue.

An embodiment of natural color matching allows a user to select the other color match combinations, R+G, G+B, B+G, Red, Green, Blue. The process of naturally matching colors for these selections is similar to matching with all three RGB components as described above. Ratios are determined by dividing the selected components of a color by the weighted sum of the components not selected. One may consider two classes of these selections: single component selections including Red, Green, and Blue, and two component selections including R+G, G+B, and B+G.

For single component selections, given the source color components, $R_S$, $G_S$, and $B_S$, and the destination color components $R_D$, $G_D$, $B_D$, an adjusted destination component may be determined as follows, using an adjusted red component, $R'_D$, as an example. A weighted sum of the green and blue source components, $G_D$ and $B_D$ approximates source luminance, $Y_S$. This weighted sum may be defined by the following equation:

Equation 12:
$$Y_S = \frac{0.587 \cdot G_S + 0.114 \cdot B_S}{0.587 + 0.114}$$

The source red/luminance ratio, $\rho_{RS}$, of the source color is determined. The source red/luminance ratio $\rho_{RS}$ may be defined by the following equation:

Equation 13:
$$\rho_{RS} = \frac{R_S}{Y_S}$$

A weighted sum of the green and red destination components, $G_S$ and $B_S$, may approximate the destination luminance, $Y_D$. This weighted sum may be defined by the equation:

Equation 14:
$$Y_D = \frac{0.587 \cdot G_D + 0.114 \cdot B_D}{0.587 + 0.114}$$

The destination red/luminance ratio, $\rho_{RS}$, is determined. The source red/luminance ratio $\rho_{RS}$ may be defined by the following equation:

Equation 15:
$$\rho_{RD} = \frac{R_D}{Y_D}$$

The adjusted red component, $R'_D$, may be determined by combining Equations 12–15 to produce the following equation:

Equation 16:
$$R'_D = \frac{\rho_{RD}}{\rho_{RS}} R_S = \frac{Y_S}{Y_D} R_D$$

For two component selections, given the source color components, $R_S$, $G_S$, and $B_S$, and the destination color components $R_D$, $G_D$, $B_D$, an adjusted destination component may be determined as follows, using adjusted red and blue components, $R'_D$ and $B'_D$ as examples. The green source component approximates source luminance, $Y_S$.

Equation 17: $G_S = Y_S$

A source red/luminance ratio $\rho_{RS}$ and a source blue/luminance ratio $\rho_{BS}$ is determined. These ratios may be defined by the following equations:

Equation 18:
$$\rho_{RS} = \frac{R_S}{Y_S}$$

Equation 19:
$$\rho_{BS} = \frac{B_S}{Y_S}$$

The green component of the source color, $G_D$, may approximate luminance, $Y_D$ Equation 20: $Y_D = G_D$ The destination red/luminance ratio $\rho_{RD}$ and the destination blue/luminance ratio $\rho_{BD}$ are determined. These ratios may be defined by the following equations:

Equation 21:
$$\rho_{RD} = \frac{R_D}{Y_D}$$

Equation 22:
$$\rho_{BD} = \frac{B_D}{Y_D}$$

Equations 17–22 may be combined to determine the adjusted red and blue components $R'_D$ and $B'_D$ as defined by the following equations:

Equation 23:
$$R'_D = \frac{\rho_{RD}}{\rho_{RS}} R_S = \frac{Y_S}{Y_D} R_D$$

Equation 24:
$$B'_D = \frac{\rho_{BD}}{\rho_{BS}} B_S = \frac{Y_S}{Y_D} B_D$$

Thus, natural color matching adjusts the values of the selected destination color components as a product of the ratio of the source and destination luminance of the selected components and the value of destination component.

FIG. 16 is a block diagram illustrating an embodiment of data structures used in storing modifications specified for source media and modifications specified for composition media. In particular, FIG. 16 illustrates example source and composition color modification data structures, 138 and 140, respectively. Both the source and composition modification structures 138 and 140 may include color modifications specific to a HSL, channels, levels, and curves color functions and parameters. Parameters may be considered a subclass of functions as parameters are essentially simple linear functions or constants. Bot the data structures 138 and 140 may include references to other data structures specific to the color functions, for example, HSL modifications data structure 404, channels modifications data structure 406, levels modifications data structure 408 and curves modifications data structure 410. These functions may have been defined through the user interface described above in connection with FIGS. 14a–14d, using the color function buttons 254, 252, 250, and 248 to access the HSL, channel, levels and curves screen, respectively.

In FIG. 16, if there are multiple sub-structures that are identical in form, then only one of the sub-structures are illustrated in full detail. Items in a data structure followed by a "□" character indicates a sub-structure indicated by an arrow to the sub-structure. For example, in the source color modification data structure 138, the □ next to "HSL" indicates that there is a sub-structure 404 defining HSL color modifications. Items followed by a "·" character indicates a parameter, with a category in parentheses. For example, in the channels color modification data structure 406, the · next to "preview_mode (num)" indicates that there is a numeric parameter defining the preview mode selected by a user. Items followed by a "f"indicate a function. Functions may be stored as fixed length array of input/output pairs of values. These values are used to calculate a lookup table that define the function. For example, in the curves color modification data structure 410, the f next to "red (rgb)" indicates a function for RGB component curves. Using functions and lookup tables to define color modifications is described in U.S. Patent Application entitled "Multi-tone Representation of a Digital Image on a Digital Non-Linear Editing System," by Robert Gonsalves, filed Apr. 16, 1999, application Ser. No. 09/293,732, and the Cacciatore Application. The data structures of FIG. 16 may be used to define coefficients for a matrix or values of a lookup table as described in the Cacciatore application.

A multimedia composition may be represented and edited with a typical computer system. The invention is not limited to any specific computer described herein. Many other different machines may be used to implement source color modification. Such a suitable computer system includes a processing unit which performs a variety of functions and a manner well-known in the art in response to instructions provided from an application program. The processing unit functions according to a program known as the operating system, of which many types are known in the art. The steps of an application program are typically provided in random access memory (RAM) in machine-readable form because programs are typically stored on a non-volatile memory, such as a hard disk or floppy disk. After a user selects an application program, it is loaded from the hard disk to the RAM, and the processing unit proceeds through the sequence of instructions of the application program.

The computer system also includes a user input/output (I/O) interface. The user interface typically includes a display apparatus (not shown), such as a cathode-ray-tube (CRT) display in an input device (not shown), such as a keyboard or mouse, a variety of other known input and output devices may be used, such as speech generation and recognition units, audio output devices, etc.

The computer system also includes a video and audio data I/O subsystem. Such a subsystem is well-known in the art and the present invention is not limited to the specific subsystem described herein. The audio portion of subsystem includes an analog-to-digital (A/D) converter (not shown), which receives analog audio information and converts it to digital information. The digital information may be compressed using known compression systems, for storage on the hard disk to use at another time, a typical video portion of subsystem includes a video image compressor/decompressor (not shown) of which many are known in the art. Such compressor/decompressors convert analog video information into compressed digital information. The compressed digital information may be stored on hard disk for use at a later time. An example of such a compressor/decompressor is described in U.S. Pat. No. 5,355,450.

One or more output devices may be connected to a playback system or editing system. Example output devices include a cathode ray tube (CRT) display, liquid crystal displays (LCD) and other video output devices, printers, communication devices such as a modem, storage devices such as disk or tape, and audio output. One or more input devices may be connected to the editing or playback system. Example input devices include a keyboard, keypad, track ball, mouse, pen and tablet, communication device, and data input devices such as audio and video capture devices and sensors. The editing and playback systems are not limited to the particular input or output devices used in combination with the computer system or to those described herein.

The editing or playback system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

The playback system or editing system used to implement source or composition modification is not limited to a particular computer platform, particular processor, or particular programming language. Additionally, the computer system may be a multi processor computer system or may include multiple computers connected over a computer network. Each step of FIGS. 9–11, and 13 may be separate modules of a computer program, or may be separate computer programs. Such modules may be operable on separate computers.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein describe modifications to video media, numerous audio embodiments are within the scope of one of ordinary skill in the art of digital media editing.

What is claimed is:

1. A method of processing a modification to be applied to one or more segments of digital media, wherein each segment represents at least a section of a digital media source, the method comprising:

receiving an indication of a modification to be applied to a first segment;

receiving an indication of a source relationship of the first segment;

storing a first indication of the modification such that the modification is applied to other segments having the source relationship in common with the first segment.

2. The method of claim 1, further comprising:

accessing a common attribute parameter of the first segment to be applied to determine a common attribute that the first segment and other segments on the system share in common, wherein the first attribute is identified in accordance with the common attribute parameter.

3. The method of claim 2, further comprising:

identifying a first data structure corresponding to the first attribute, the first data structure storing modifications made to segments having the first attribute in common with the first segment; and storing the modification in the first data structure.

4. The method of claim 1, further comprising:

maintaining a first table corresponding to a digital media composition to which first the first segment belongs, the first table including a plurality of entries, each entry containing a segment attribute and an indication of a modification to be applied to segments of the media composition having the segment attribute, wherein the first indication and the first attribute are stored in a first entry of the first table.

5. The method of claim 1, where in the first attribute is a name of a source data structure from which the first segment originates.

6. The method of claim 1, where in the first segment includes a first identifier that identifies the first data structure, and the step of identifying a first attribute of the first segment includes:

accessing the first identifier of the first segment to determine the first data structure.

7. The method of claim 2, further comprising:

receiving a signal indicating the common attribute parameter of the first segment.

8. The method of claim 1, further comprising:

sequentially accessing segments on the system, wherein the first indication of the modification is stored in each accessed segment that has the first attribute in common with the first segment.

9. The method of claim 3, wherein the first data structure is a source data structure.

10. The method of claim 3, wherein the first data structure is a first table including a plurality of entries, each entry including a modification to be applied to segments having the first attribute in common.

11. The method of claim 9, wherein the source data structure is a source clip.

12. The method of claim 9, wherein the source data structure is a master clip.

13. The method of claim 9, wherein the source data structure is a physical media object.

14. The method of claim 1, wherein the first segment is an audio segment.

15. The method of claim 1, wherein the first segment is a video segment.

16. A method of applying a modification to a first section of a digital media source on a digital nonlinear editing system, wherein a first segment of a media composition represents the first section, the method comprising:

accessing the first segment;

identifying a first source data structure from which the first segment originates, the first source data structure representing at least the first section of the digital media source;

determining whether the first source data structure includes a first indication that defines a first modification to be applied to sections of the digital media source represented by segments that originate from the first source data structure; and if the first source data structure includes the first indication, applying the first modification to the first section of media represented by the first segment.

17. The method of claim 16, further comprising:

identifying a second source data structure from which the first source data structure originates, the second source data structure representing the digital media source;

determining whether the second source data structure includes a second indication that defines a second modification to be applied to sections of the digital media represented by segments that originate from the second source data structure; and if the second source data structure includes the second indication and the first source data structure does not include the first indication, applying the second modification to the first section of digital media source.

18. The method of claim 17, further comprising:

identifying a physical media data structure from which the second source data structure originates and that represents a physical media from which the digital media source was created;

determining whether the physical media data structure includes a third indication that defines a third modification to be applied to sections of the digit media represented by segments that originate from the physical media data structure; and if the physical media data structure includes the third indication and the second source data structure does not include the second indication and the first source data structure does not include the first indication, applying the third modification to the first section of digital media source.

19. The method of claim 17, wherein the first segment includes a source identifier, and the step of identifying the first source data structure of the first segment includes:

accessing the source identifier of the first segment to determine the first source data structure.

20. The method of claim 17, further comprising:

determining whether the first segment includes a second indication that defines a second modification defined by the composition to be applied to the first section of the digital media source represented by the first segment; and if the first segment includes the second indication, applying the second modification to the first section of the digital media source, such that, if the first source data structure includes the first indication, a combined modification of the first and second modification is applied to the first section of the digital media.

21. The method of claim 17, wherein the first source data structure is a source clip.

22. The method of claim 18, wherein the first source data structure is a subclip of a master source clip and the second source data structure is the master source clip.

23. The method of claim 19, wherein the first source data structure is a subclip of a master source clip and the second source data structure is the master source clip.

24. The method of claim 16, wherein the first segment is an audio segment.

25. The method of claim 16, wherein the first segment is an video segment.

26. A method of applying a modification to a first section of a digital media source on a digital nonlinear editing system, wherein a first segment of a media composition represents the first section, the method comprising:

accessing the first segment;

accessing each entry of a first table that corresponds to the media composition, the first table including a plurality of entries, each entry containing a segment attribute and an indication of a modification to be applied to segments of the composition having the segment attribute;

for each entry, determining whether the first segment has the segment attribute; and if the segment has the segment attribute, modifying the first section of digital media with the modification contained in the entry.

27. The method of claim 26, further comprising:

determining whether the first segment includes an indication of a modification defined specifically for the composition and to be applied to the first section of the digital media source represented by the first segment; and if the first segment includes the indication defined specifically for the composition, applying the modification defined specifically for the composition to the first section of the media source, in addition to the modifications applied from the first table.

28. The method of claim 26, further comprising:

for each entry of the first table for which the first segment does have the attribute, receiving an instruction from a user whether to modify the first section of digital media with the modification of the entry, wherein if the instruction instructs to modify, the first section of digital media is modified with the modification of the entry.

29. The method of claim 27, further comprising:

for each entry of the first table for which the first segment does have the attribute, receiving an instruction from a user whether to modify the first section of digital media with the modification of the entry, wherein if the instruction instructs to modify, the first section of digital media is modified with the modification of the entry.

30. The method of claim 26, wherein the first segment is an audio segment.

31. The method of claim 26, wherein the first segment is an video segment.

32. A system for processing a modification to be applied to one or more segments of digital media, wherein each segment represents at least a section of a digital media source, the system comprising:

means for receiving an indication of a modification to be applied to a first segment;

means for receiving an indication of a source relationship of the first segment; and means for storing a first indication of the modification such that the modification is applied to other segments having the source relationship in common with the first segment.

33. The system of claim 32, further comprising:

means for accessing a common attribute parameter of the first segment to be applied to determine a common attribute that the first segment and other segments on the system share in common, wherein the first attribute is identified in accordance with the common attribute parameter.

34. The system of claim 33, further comprising:

means for identifying a first data structure corresponding to the first attribute, the first data structure storing modifications made to segments having the first attribute in common with the first segment; and means for storing the modification in the first data structure.

35. The system of claim 32, further comprising:

means for maintaining a first table corresponding to a digital media composition to which first the first segment belongs, the first table including a plurality of entries, each entry containing a segment attribute and an indication of a modification to be applied to segments of the media composition having the segment attribute, wherein the first indication and the first attribute are stored in a first entry of the first table.

36. The system of claim 32, wherein the first attribute is a name of a source data structure from which the first segment originates.

37. The system of claim 32, wherein the first segment includes a first identifier that identifies the first data structure, and the means for identifying a first attributes of the first segment includes:

means for accessing the first identifier of the first segment to determine the first data structure.

38. The system of claim 33, further comprising:

means for receiving a signal indicating the common attribute parameter of the first segment.

39. The system of claim 32, further comprising:

means for sequentially accessing segments on the system, wherein the first indication of the modification is stored in each accessed segment that has the first attribute in common with the first segment.

40. The system of claim 34, wherein the first data structure is a source data structure.

41. The system of claim 34, wherein the first data structure is a first table including a plurality of entries, each entry including a modification to be applied to segments having the first attribute in common.

42. The system of claim 40, wherein the source data structure is a source clip.

43. The system of claim 40, wherein the source data structure is a master clip.

44. The system of claim 40, wherein the source data structure is a physical media object.

45. The system of claim 32, wherein the first segment is an audio segment.

46. The system of claim 32, wherein the first segment is a video segment.

47. A system for applying modification to a first section of a digital media source on a digital nonlinear editing system, wherein a first segment of a media composition represents the first section, the system comprising:

means for accessing the first segment;

means for identifying a first source data structure from which the first segment originates, the first source data structure representing at least the first section of the digital media source;

means for determining whether the first source data structure includes a first indication that defines a first modification to be applied to sections of the digital media source represented by segments that originate from the first source data structure; and means for applying the first modification to the first section of media represented by the first segment if the first source data structure includes the first indication.

48. The system of claim 47, further comprising:

means for identifying a second source data structure from which the first source data structure originates, the second source data structure representing the digital media source;

means for determining whether the second source data structure includes a second indication that defines a second modification to be applied to sections of the digital media represented by segments that originate from the second source data structure; and means for applying the second modification to the first section of digital media source if the second source data structure includes the second indication and the first source data structure does not include the first indication.

49. The system of claim 48, further comprising:

means for identifying a physical media data structure from which the second source data structure originates and that represents a physical media from which the digital media source was created;

means for determining whether the physical media data structure includes a third indication that defines a third modification to be applied to sections of the digital media represented by segments that originate from the physical media data structure; and means for applying the third modification to the first section of digital media source if the physical media data structure includes the third indication and the second source data structure does not include the second indication and the first source data structure does not include the first indication.

50. The system of claim 48, wherein the first segment includes a source identifier, and the means for identifying the first source data structure of the first segment includes:

means for accessing the source identifier of the first segment to determine the first source data structure.

51. The system of claim 48, further comprising:

means for determining whether the first segment includes a second indication that defines a second modification defined by the composition to be applied to the first section of the digital media source represented by the first segment; and means for applying the second modification to the first section of the digital media source if the first segment includes the second indication, such that, if the first source data structure includes the first indication, a combined modification of the first and second modification is applied to the first section of the digital media.

52. The system of claim 48, wherein the first source data structure is a source clip.

53. The system of claim 49, wherein the first source data structure is a subclip of a master source clip and the second source data structure is the master source clip.

54. The system of claim 50, wherein the first source data structure is a subclip of a master source clip and the second source data structure is the master source clip.

55. The system of claim 47, wherein the first segment is an audio segment.

56. The system of claim 47, wherein the first segment is a video segment.

57. A system for applying modification to a first section of a digital media source on a digital nonlinear editing system, wherein a first segment of a media composition represents the first section, the system comprising:

means for accessing the first segment;

means for accessing each entry of a first table that corresponds to the media composition, the first table including a plurality of entries, each entry containing a segment attribute and an indication of a modification to be applied to segments of the composition having the segment attribute;

means for determining whether the first segment has the segment attribute for each entry; and means for modifying the first section of digital media with the modification contained in the entry if the segment has the segment attribute.

58. The system of claim 57, farther comprising:

means for determining whether the first segment includes an indication of a modification defined specifically for the composition and to be applied to the first section of the digital media source represented by the first segment; and means for applying the modification defined specifically for the composition to the first section of the media source, in addition to the modifications applied from the first table, if the first segment includes the indication defined specifically for the composition.

59. The system of claim 57, further comprising:

means receiving an instruction from a user whether to modify the first section of digital media with the modification of the entry for each entry of the first table for which the first segment does have the attribute, wherein if the instruction instructs to modify, the first section of digital media is modified with the modification of the entry.

60. The system of claim 58, further comprising:

means for receiving an instruction from a user whether to modify the first section of digital media with the modification of the entry for each entry of the first table for which the first segment does have the attribute, wherein if the instruction instructs to modify, the first section of digital media is modified with the modification of the entry.

61. The system of claim 57, wherein the first segment is an audio segment.

62. The system of claim 57, wherein the first segment is a video segment.

63. A method of processing a color modification to be applied to one or more segments of digital media, wherein a first segment represents a section of a digital media source, the method comprising:

receiving an indication of a color modification to be applied to the first segment;

identifying a first source from which the first segment originates; and storing an indication of the modification such that the color modification is applied to other segments originating from the first source.

* * * * *

UNITED STATES PATENT AND TRADEMARK OFFICE
CERTIFICATE OF CORRECTION

| | | |
|---|---|---|
| PATENT NO. | : 6,571,255 B1 | Page 1 of 1 |
| APPLICATION NO. | : 09/392823 | |
| DATED | : May 27, 2003 | |
| INVENTOR(S) | : Robert Gonsalves et al. | |

Figure 13A:
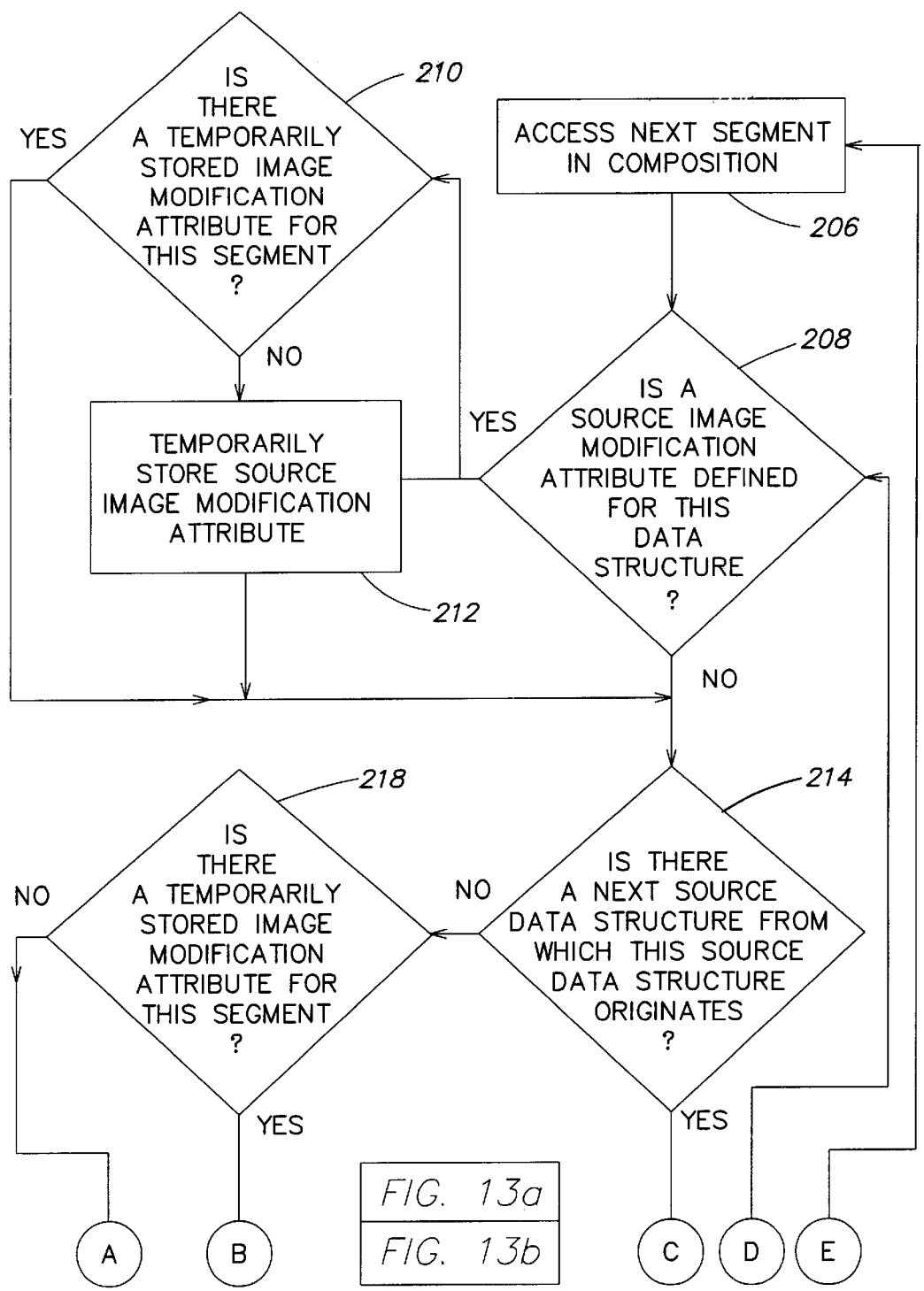
FIG. 13 is a flow chart illustrating an embodiment of a process of implementing source color modification and composition color modification during playback.
Figure 13B:
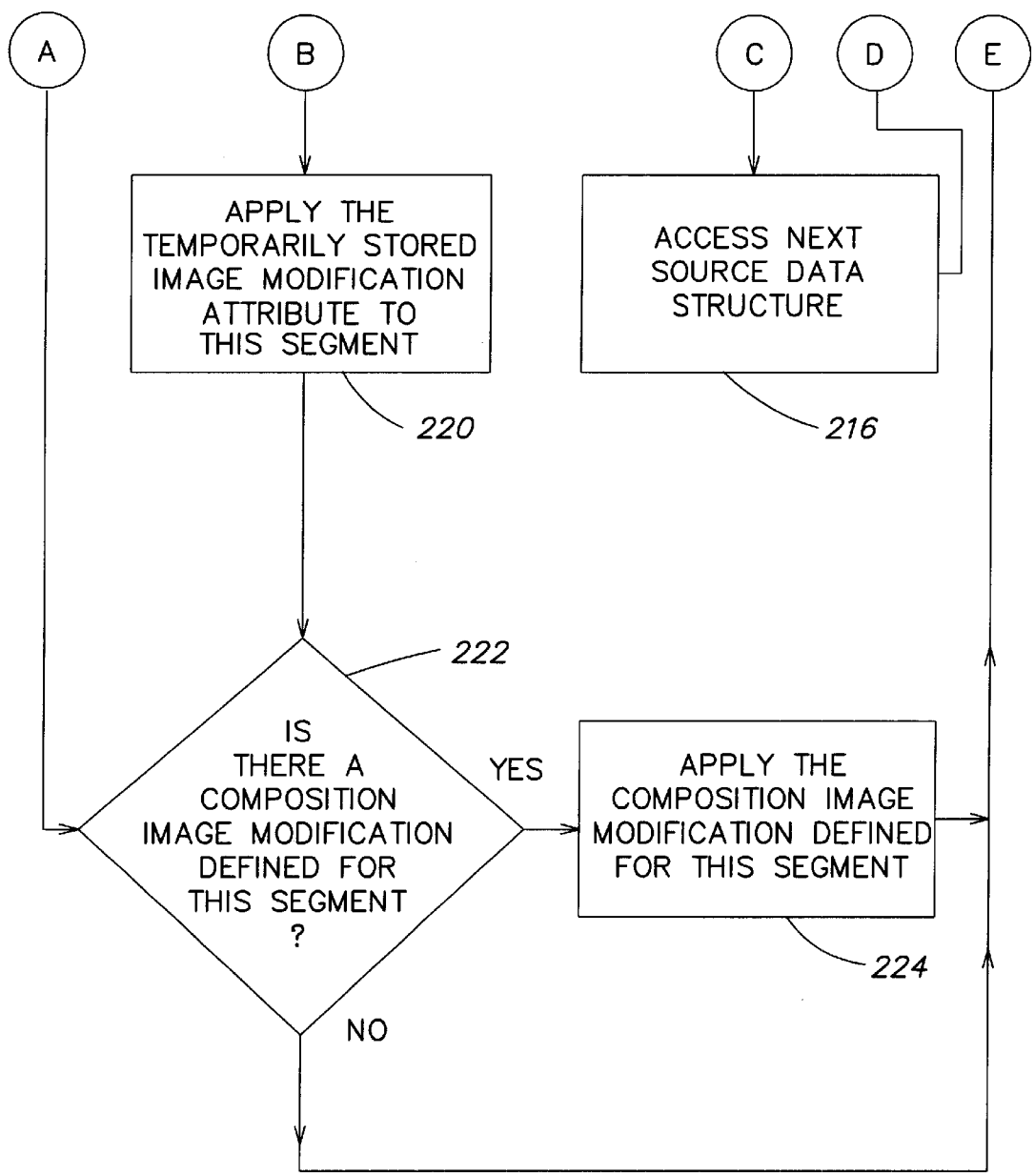

It is certified that error appears in the above-identified patent and that said Letters Patent is hereby corrected as shown below:

In column 6, line 1, delete "FIG. 13 is a flow chart" and insert therefore --FIGS. 13a and 13b are flowcharts--.

Figure 16A:
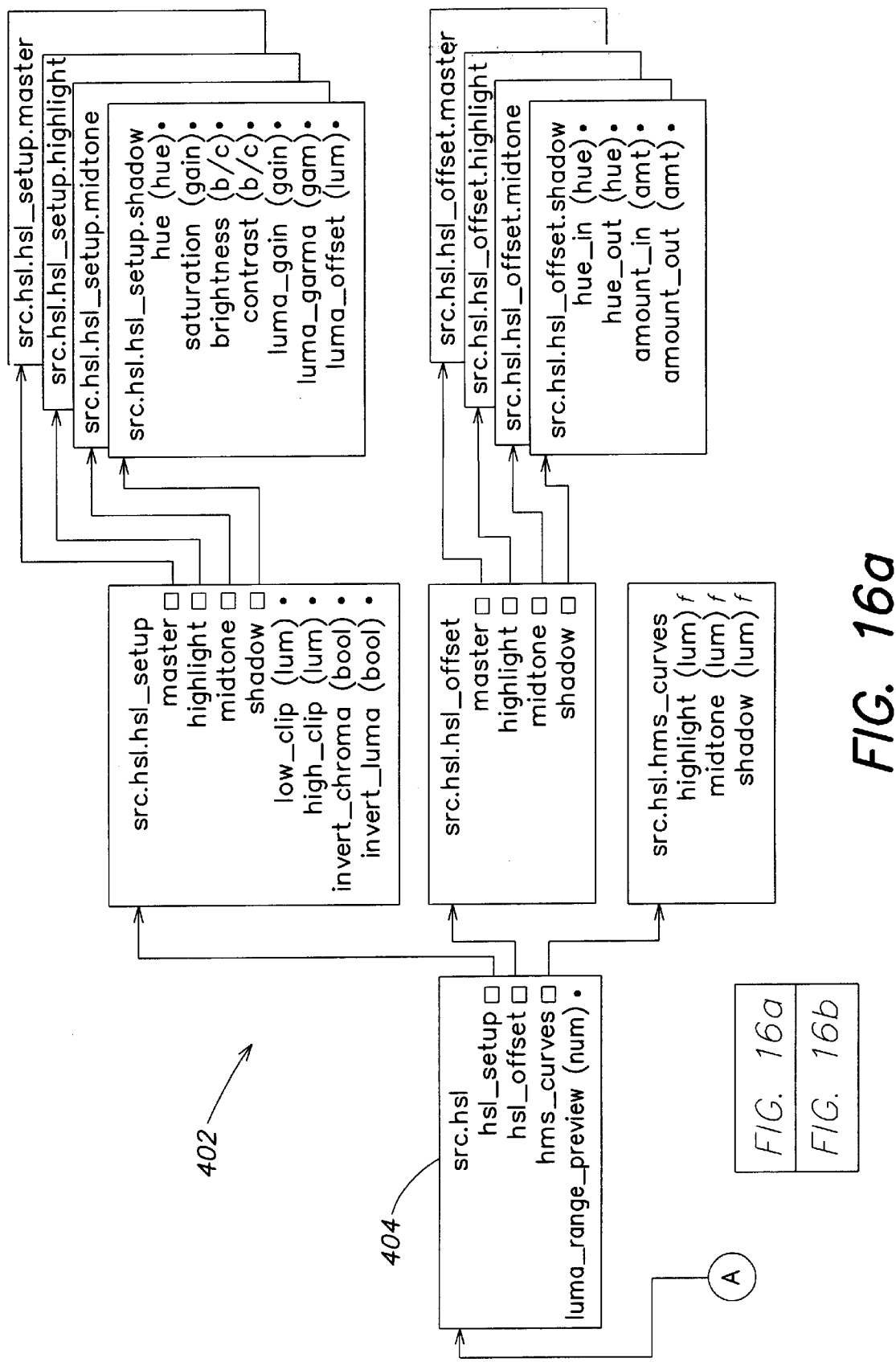
FIG. 16 is a block diagram illustrating an embodiment of the storage of source and composition color modifications.
Figure 16B:
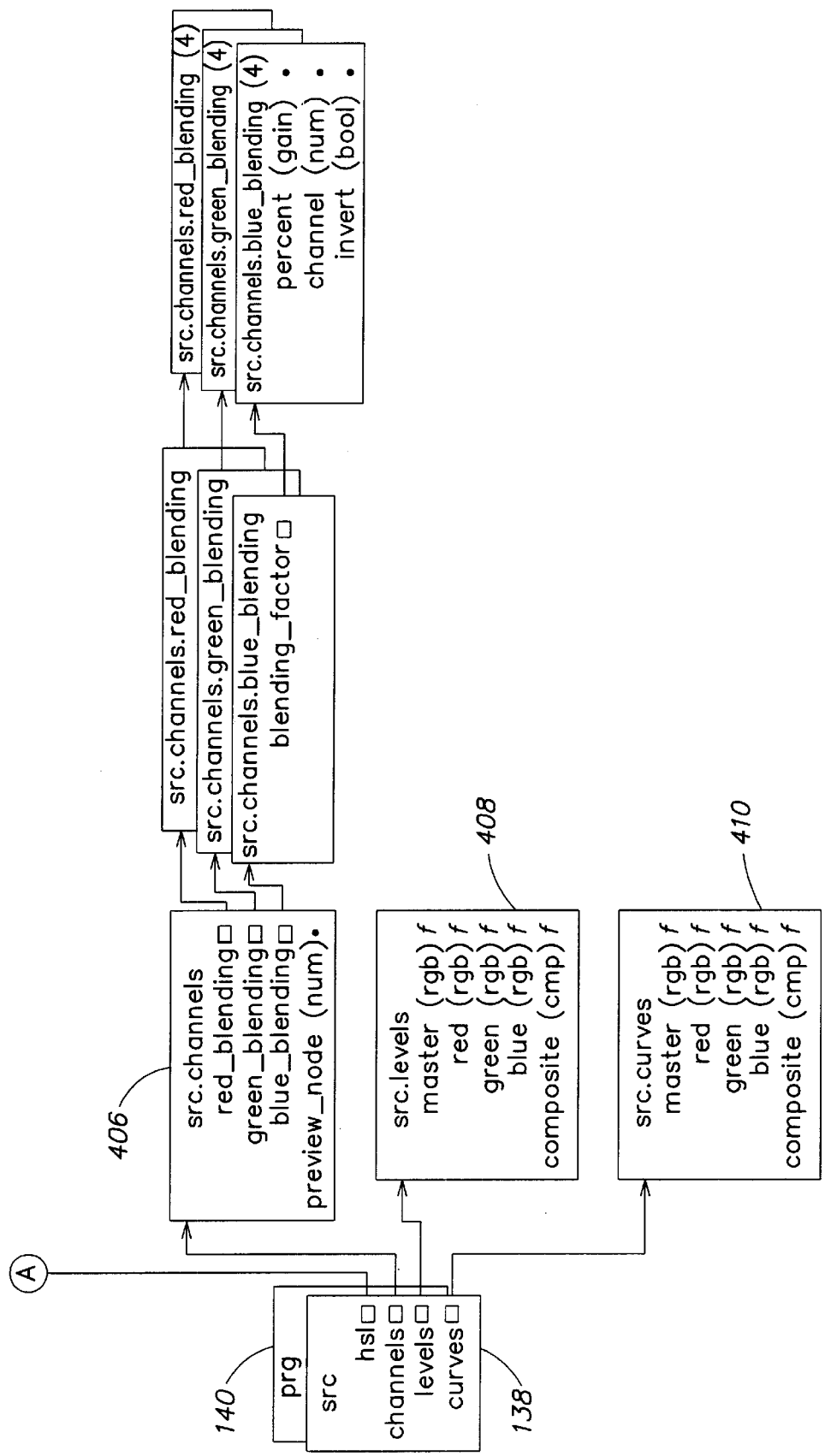

In column 6, line 8, delete "FIG. 16 is a block diagram" and insert therefore --FIGS. 16a and16b are block diagrams--.

In column 17, line 48, replace "190" with --198--.

In column 18, line 46, delete "FIG. 13 is a" and insert --FIGS. 13a and 13b show a--.

In column 26, line 34, delete "FIG. 16 is a block" and insert --FIGS. 16a and 16b show a block--.

In column 26, line 37, delete "FIG. 16" and insert --FIGS. 16a and 16b--.

In column 26, line 53, delete "FIG. 16 is a block" and insert --FIGS. 16a and16b show a block--.

Signed and Sealed this

Fifteenth Day of January, 2008

JON W. DUDAS
*Director of the United States Patent and Trademark Office*